US010538252B2

(12) United States Patent
Ebina et al.

(10) Patent No.: US 10,538,252 B2
(45) Date of Patent: Jan. 21, 2020

(54) INFORMATION PRESENTING DEVICE AND INFORMATION PRESENTING METHOD

(71) Applicant: Nissan Motor Co., Ltd., Yokohama-Shi, Kanagawa (JP)

(72) Inventors: Akihiko Ebina, Kanagawa (JP); Machiko Hiramatsu, Kanagawa (JP); Takashi Sunda, Kanagawa (JP); Youji Shimizu, Kanagawa (JP); Takayuki Kondoh, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/764,380

(22) PCT Filed: Sep. 30, 2015

(86) PCT No.: PCT/JP2015/077710
§ 371 (c)(1),
(2) Date: Mar. 29, 2018

(87) PCT Pub. No.: WO2017/056224
PCT Pub. Date: Apr. 6, 2017

(65) Prior Publication Data
US 2018/0281818 A1 Oct. 4, 2018

(51) Int. Cl.
*B60W 50/14* (2012.01)
*B60W 50/10* (2012.01)
(Continued)

(52) U.S. Cl.
CPC ............ *B60W 50/10* (2013.01); *B60K 35/00* (2013.01); *B60K 37/04* (2013.01); *B60K 37/06* (2013.01);
(Continued)

(58) Field of Classification Search
CPC ...... B60W 50/14; B60W 50/146; G01C 21/36
See application file for complete search history.

(56) References Cited

U.S. PATENT DOCUMENTS 6,996,469 B2 * 2/2006 Lau .................... G01C 21/3617
340/995.21
8,849,557 B1 * 9/2014 Levandowski .......... G08G 1/01
701/300
(Continued)

FOREIGN PATENT DOCUMENTS

DE 102013110909 A1 4/2015
JP H1153685 A 2/1999
(Continued)

*Primary Examiner* — Genna M Mott
(74) *Attorney, Agent, or Firm* — Young Basile Hanlon & MacFarlane, P.C.

(57) ABSTRACT

An information presenting device is mounted in an autonomous vehicle in which an action candidate for the vehicle to take is settable based on selection from presented selection information made by an occupant. The information presenting device sets the action candidate for the autonomous vehicle to take, calculates a selection margin time from a current time point to a time point at which the occupant should complete the selection from the selection information, sets the selection information based on the action candidate depending on the selection margin time, and presents the set selection information to the occupant.

16 Claims, 24 Drawing Sheets

(51) Int. Cl.
*B60K 35/00* (2006.01)
*B60W 40/04* (2006.01)
*G08G 1/01* (2006.01)
*G08G 1/0962* (2006.01)
*G01C 21/26* (2006.01)
*G08G 1/09* (2006.01)
*B60W 30/14* (2006.01)
*B62D 6/00* (2006.01)
*B60K 37/04* (2006.01)
*B60K 37/06* (2006.01)
*G01C 21/36* (2006.01)
*B60W 30/18* (2012.01)
*B60W 50/00* (2006.01)
*G05D 1/00* (2006.01)

(52) U.S. Cl.
CPC ...... *B60W 30/14* (2013.01); *B60W 30/18009* (2013.01); *B60W 40/04* (2013.01); *B60W 50/0097* (2013.01); *B60W 50/14* (2013.01); *B62D 6/00* (2013.01); *G01C 21/26* (2013.01); *G01C 21/3664* (2013.01); *G05D 1/0088* (2013.01); *G08G 1/01* (2013.01); *G08G 1/09* (2013.01); *G08G 1/0962* (2013.01); *B60K 2370/186* (2019.05); *B60K 2370/736* (2019.05); *B60W 2540/02* (2013.01); *B60W 2540/04* (2013.01); *G05D 2201/0213* (2013.01)

(56) References Cited

U.S. PATENT DOCUMENTS

| | | | |
|---|---|---|---|
| 9,475,491 B1* | 10/2016 | Nagasaka | B60W 30/16 |
| 9,494,439 B1* | 11/2016 | Ross | B60W 50/029 |
| 9,694,681 B2 | 7/2017 | Kleen et al. | |
| 9,958,870 B1* | 5/2018 | Graybill | G05D 1/0268 |
| 2012/0154175 A1 | 6/2012 | Bandou et al. | |
| 2013/0044218 A1 | 2/2013 | Matsuda et al. | |
| 2013/0049987 A1* | 2/2013 | Velusamy | G08G 1/0112 340/905 |
| 2015/0149088 A1* | 5/2015 | Attard | G01C 21/36 701/538 |
| 2016/0214483 A1 | 7/2016 | Kleen et al. | |
| 2016/0375766 A1* | 12/2016 | Konet | B60K 35/00 348/148 |
| 2017/0151958 A1* | 6/2017 | Sakuma | B60W 50/10 |
| 2018/0052458 A1* | 2/2018 | Tsuji | B60W 50/14 |
| 2018/0173231 A1* | 6/2018 | Takae | B60W 50/14 |

FOREIGN PATENT DOCUMENTS

| | | |
|---|---|---|
| JP | 200133256 A | 2/2001 |
| JP | 2009139261 A | 6/2009 |
| JP | 2012128799 A | 7/2012 |
| JP | 2015141476 A | 8/2015 |
| WO | 2011132388 A1 | 10/2011 |

* cited by examiner

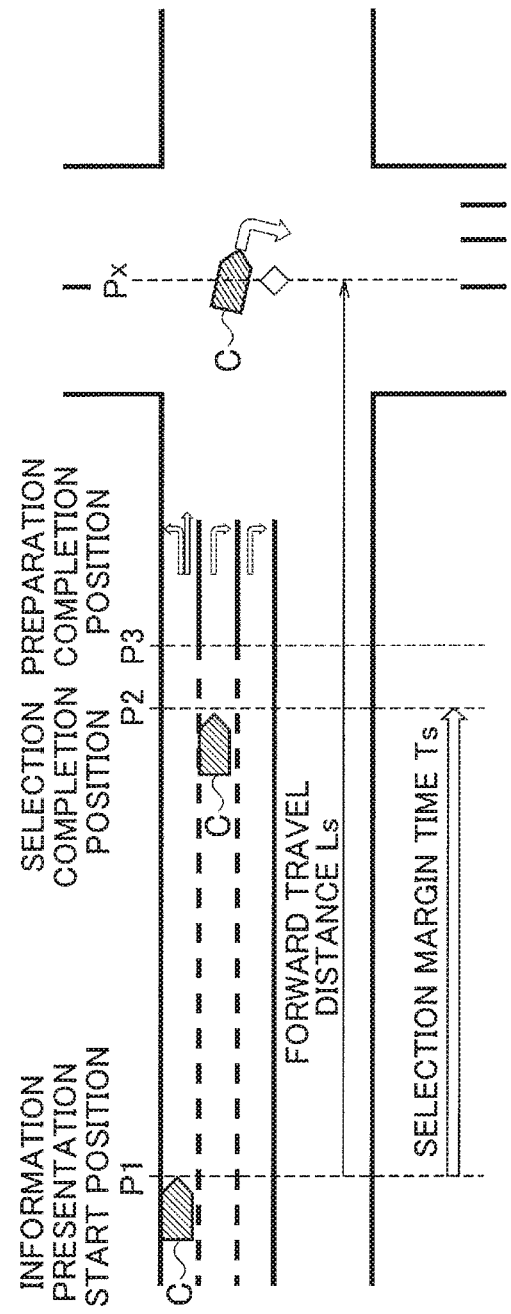

FIG. 3

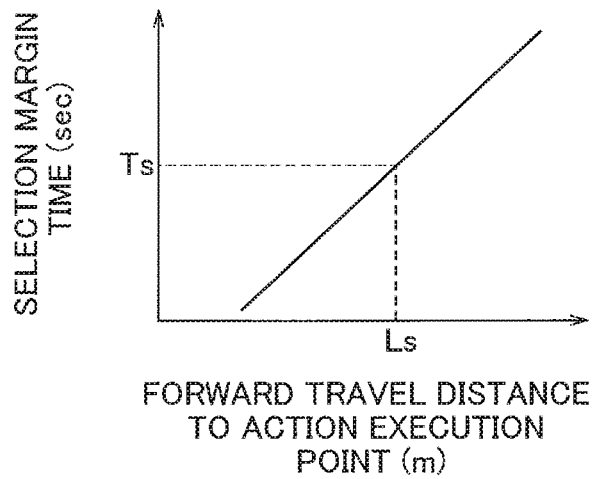

FORWARD TRAVEL DISTANCE
TO ACTION EXECUTION
POINT (m)

FIG. 4

| ACTION | SELECTION ITEM EXAMPLES |
|---|---|
| RIGHT OR LEFT TURN | LANE BEFORE RIGHT OR LEFT TURN (EXIT LANE) LANE AFTER RIGHT OR LEFT TURN (ENTRANCE LANE) CANDIDATE OF INTERSECTION TO MAKE RIGHT OR LEFT TURN (ORDER NUMBER OF INTERSECTION) LANE CHANGE POSITION BEFORE RIGHT OR LEFT TURN (EARLY, MEDIUM, LATE) |
| LANE CHANGE | RIGHT LANE, LEFT LANE |
| CRUISING | VEHICLE SPEED (SET AT INTERVALS OF 10 km/h, INTERVALS OF 5 km/h, INTERVALS OF 1 km/h) DISTANCE BETWEEN VEHICLES (THREE LEVELS, FIVE LEVELS), TRAVEL LANE LATERAL POSITION IN LANE (LEFT, CENTER, RIGHT (THREE LEVELS, FIVE LEVELS)) |
| APPROACHING SLOW CAR | DECELERATION, OVERTAKE |
| BRANCHING/ INTERSECTION | BRANCHING DESTINATION, ROUTE IN INTERSECTION |
| MERGING | MERGING POSITION IN MERGING SECTION (NEAR, MEDIUM, FAR) |

| SELECTION MARGIN TIME | MAXIMUM NUMBER OF CHOICES |
|---|---|
| LESS THAN T1 | 2 |
| T1 TO T2 | 3 |
| T2 OR MORE | 5 |

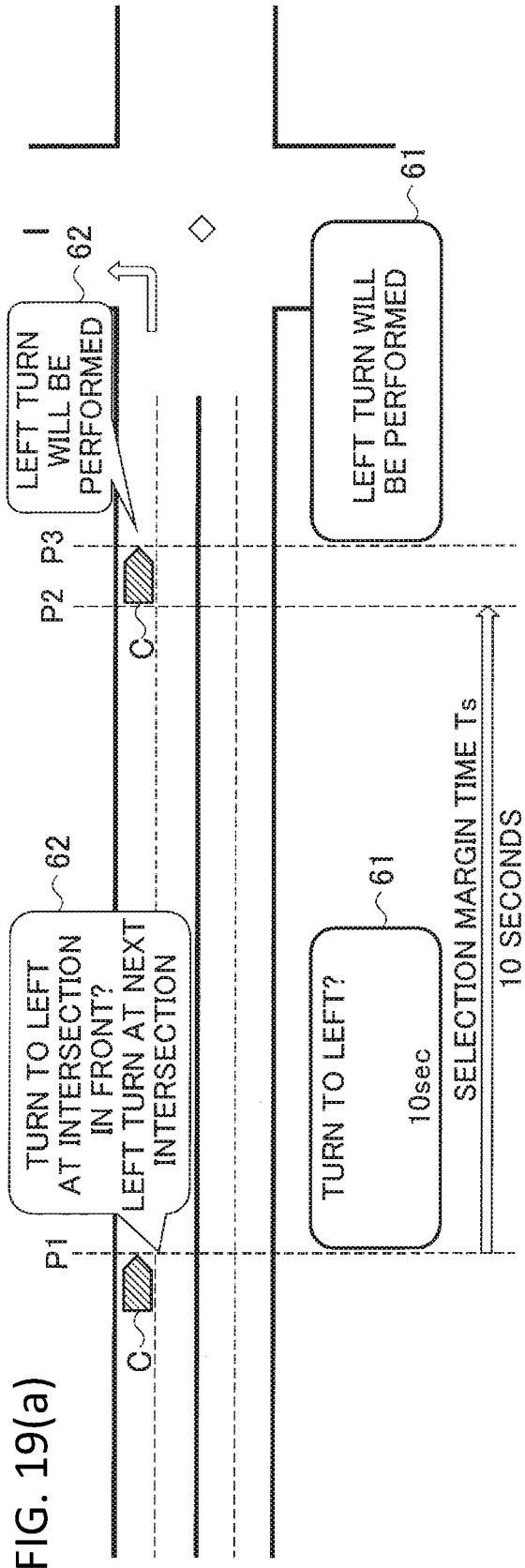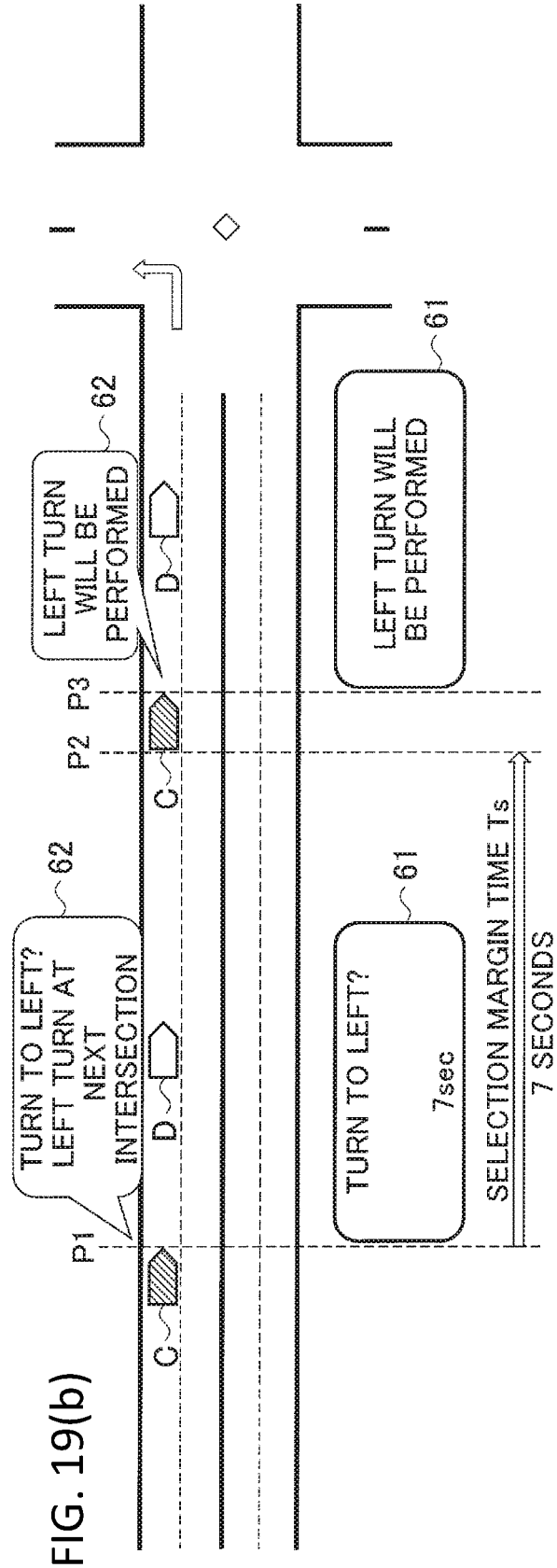

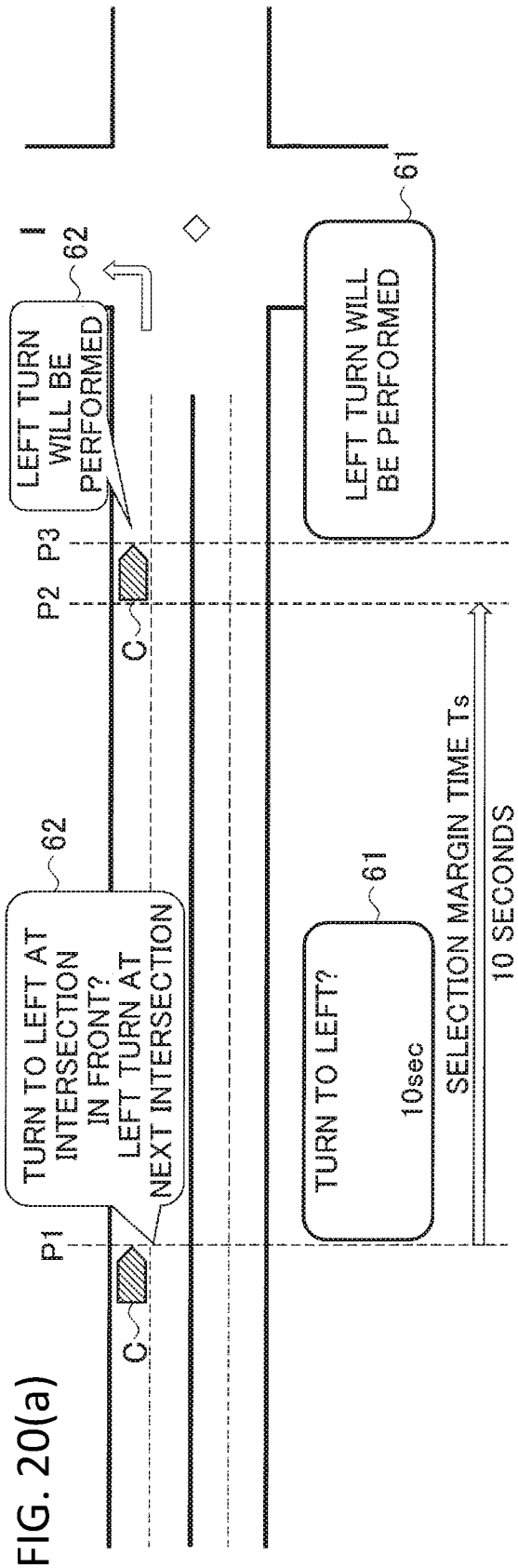
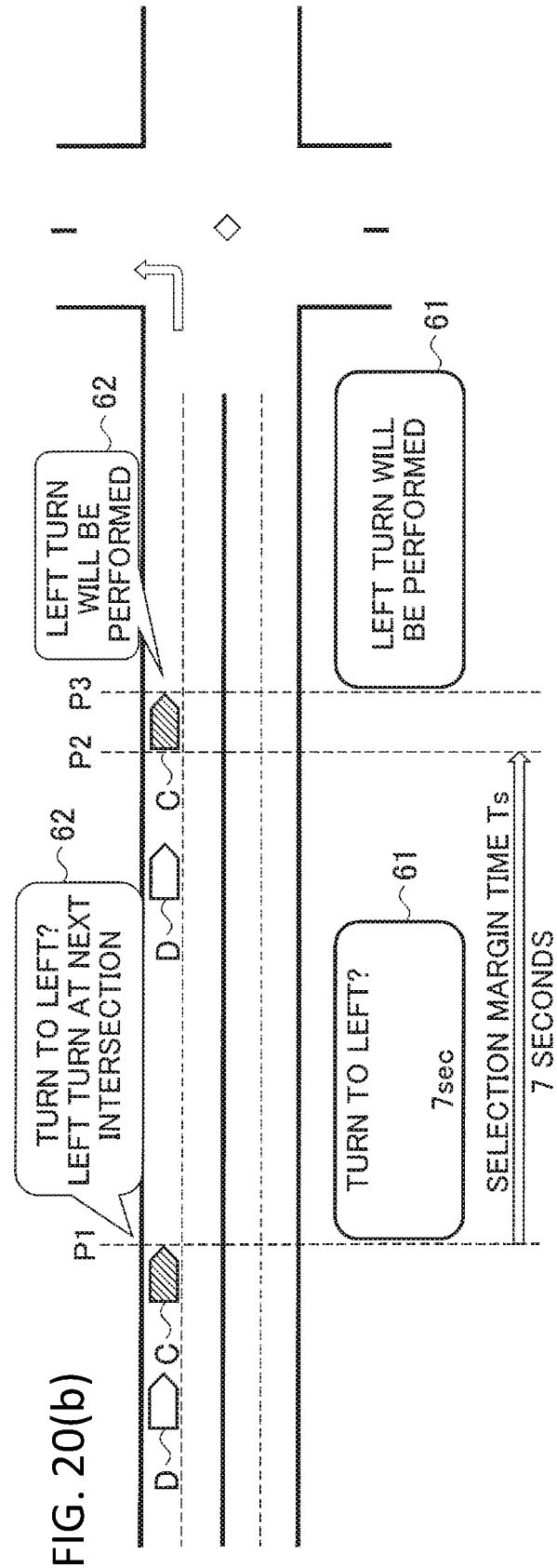
FIG. 20(a)
FIG. 20(b)

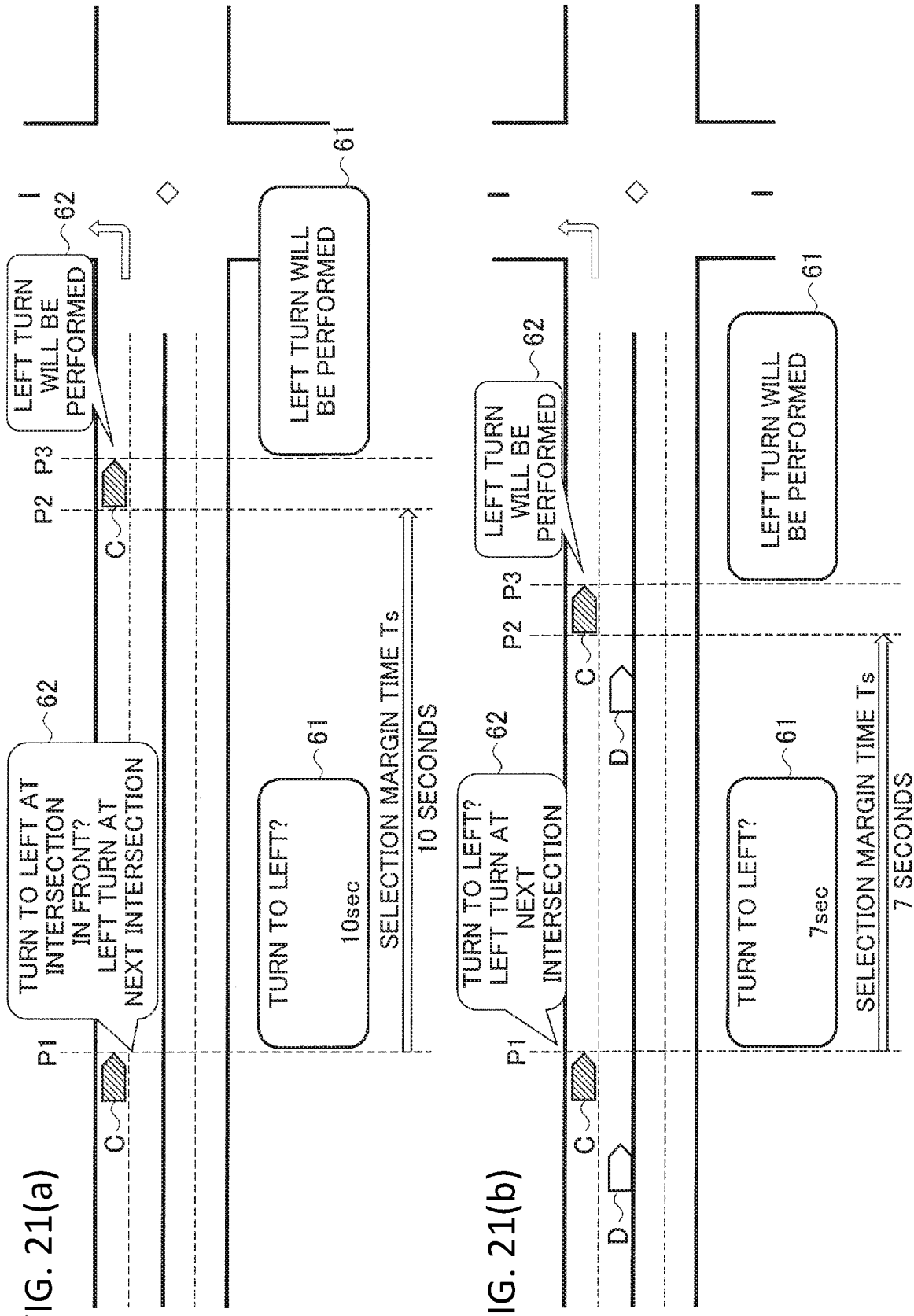

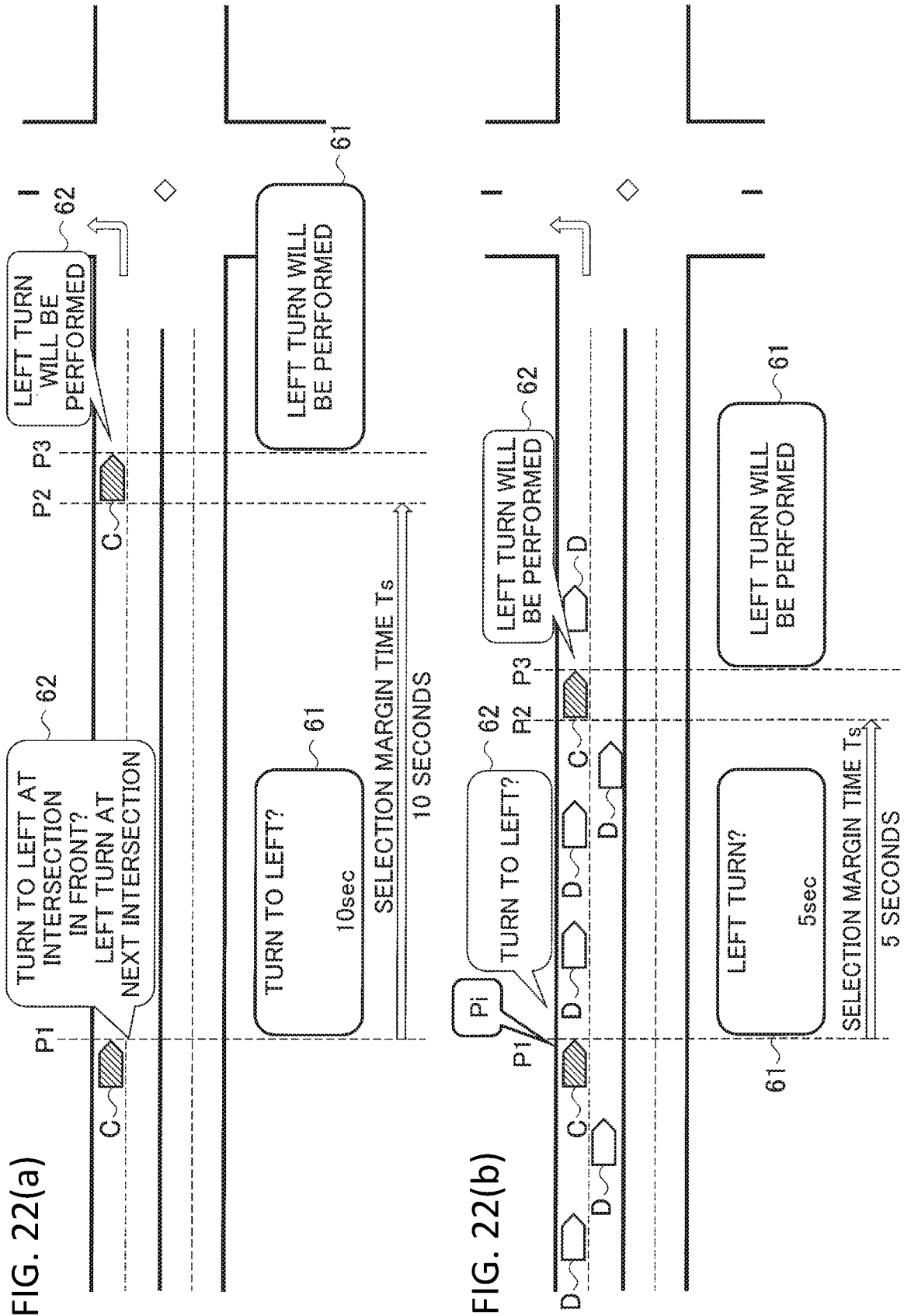

INFORMATION PRESENTING DEVICE AND INFORMATION PRESENTING METHOD

TECHNICAL FIELD

The present invention relates to an information presenting device and an information presenting method which present information to an occupant in an autonomous vehicle.

BACKGROUND

There is proposed a technique in which a vehicle-mounted electronic device such as a navigation device changes display contents and speech rate of information in multiple stages instead of two stages respectively for travel and stop, depending on the speed of a vehicle to appropriately present the information to a driver depending on a travel environment (see Japanese Patent Application Publication No. 2001-33256).

However, the technique described in Japanese Patent Application Publication No. 2001-33256 is a technique for changing the method of presenting information depending on the speed of the vehicle and no consideration is given to a time required for the driver to make judgment and selection when the driver makes selection from the presented selection information.

SUMMARY

In view of the problem described above, an object of the present invention is to provide an information presenting device and an information presenting method which can present appropriate selection information depending on conditions of a vehicle.

An information presenting device is mounted in an autonomous vehicle in which an action candidate for the vehicle to take is settable based on selection by an occupant from presented selection information. The information presenting device sets the action candidate for the autonomous vehicle to take, calculates a selection margin time from a current time point to a time point at which the occupant should complete the selection from the selection information, sets the selection information based on the action candidate, depending on the selection margin time, and presents the set selection information to the occupant.

The present invention can provide the information presenting device and the information presenting method which can present appropriate selection information depending on conditions of the vehicle by considering a time necessary for selection of information.

BRIEF DESCRIPTION OF THE DRAWINGS

FIG. 2 is a diagram explaining an operation of the information presenting device according to the first embodiment of the present invention;

FIG. 3 is a diagram explaining a method of calculating a selection margin time in the information presenting device according to the first embodiment of the present invention;

FIG. 4 is a table depicting an example of selection items corresponding to action candidates in the information presenting device according to the first embodiment of the present invention;

FIGS. 19A and 19B are diagrams explaining an operation example of the information presenting device according to the second embodiment of the present invention;

FIGS. 20A and 20B are diagrams explaining an operation example of the information presenting device according to the second embodiment of the present invention;

FIGS. 21A and 21B are diagrams explaining an operation example of the information presenting device according to the second embodiment of the present invention;

FIGS. 22A and 22B are diagrams explaining an operation example of the information presenting device according to the second embodiment of the present invention;

DETAILED DESCRIPTION OF THE EMBODIMENTS

Figure 1:
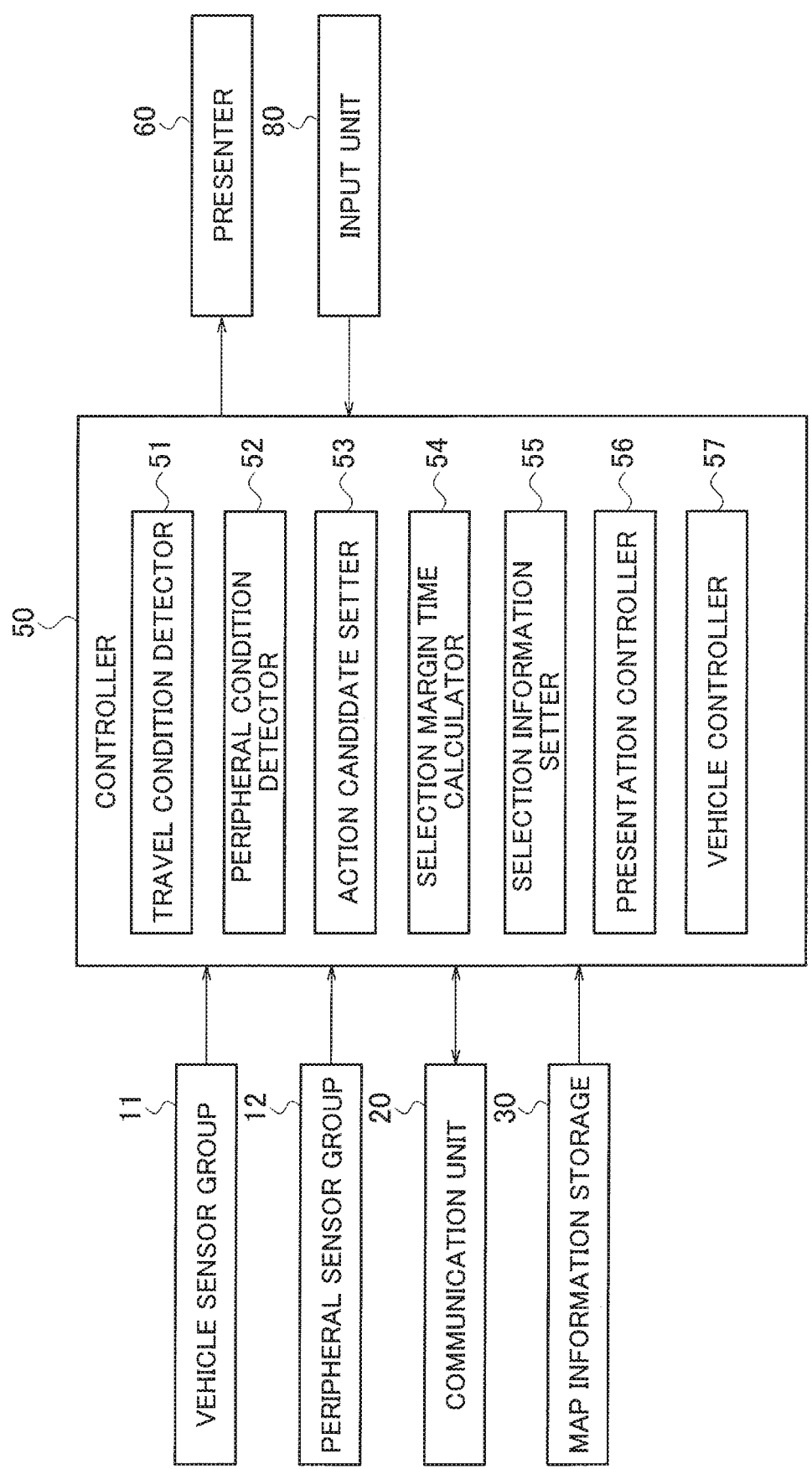
FIG. 1 is a block diagram explaining an example of a configuration of an information presenting device according to a first embodiment of the present invention.

First and second embodiments of the present invention are described with reference to the drawings. In the description of the drawings, the same or similar parts are denoted by the same or similar reference numerals and overlapping description is omitted.

First Embodiment

As illustrated in FIG. 1, an information presenting device according to the first embodiment of the present invention includes a vehicle sensor group 11, a peripheral sensor group 12, a communication unit 20, a map information storage 30, a controller 50, a presenter 60, and an input unit 80. The information presenting device according to the first embodiment is mounted in an autonomous vehicle C (see FIG. 2) which is autonomously driven on roads based on selection made by an occupant, and presents selection information from which selection is made by the occupant. The autonomous vehicle C can set action candidate for the vehicle to take based on the selection by the occupant.

The vehicle sensor group 11 includes sensors such as, for example, a speed sensor, an acceleration sensor, an angular speed sensor, and a steering angle sensor which are connected to a CAN (Controller Area Network) bus and which detect a travel condition of the autonomous vehicle C, devices such as a global positioning system (GPS) receiver included in a car navigation system which detect the current position of the autonomous vehicle C, and the like. The vehicle sensor group 11 detects movement amounts such as the speed of the autonomous vehicle C and the three-axis acceleration and angular speed of the autonomous vehicle C in a three-dimensional Cartesian coordinate system by using the sensors, and outputs the detection results to the controller 50 time after time.

The peripheral sensor group 12 includes sensors such as, for example, a camera, a laser range finder (LRF), an ultrasonic sensor, a millimeter wave sensor, and an infrared sensor which detect an environment around the autonomous vehicle C. The peripheral sensor group 12 outputs values detected by the respective sensors to the controller 50 time after time.

The communication unit 20 is, for example, a radio which wirelessly exchanges signals with outside. The communication unit 20 can acquire the number of vehicles around the autonomous vehicle C, the positions of these vehicles, the speeds of these vehicles, and the like by performing inter-vehicle communication in which the communication unit 20 exchanges the position, speed, and the like of the vehicle with the other vehicles or by performing road-vehicle communication in which the communication unit 20 exchanges the position, speed, and the like of the vehicle with a road-side device installed on the road side. The communication unit 20 may acquire various pieces of information from the outside by using an intelligent transport system (ITS) which sends weather information, traffic information such as traffic jam information and traffic control information, and the like in real time. The communication unit 20 outputs the acquired information to the controller 50 time after time.

The map information storage 30 stores map information including roads, lanes in each road, features around the roads, and the like. The map information storage 30 can be configured by a semiconductor memory, a magnetic disk, or the like.

The controller 50 includes a travel condition detector 51, a peripheral condition detector 52, an action candidate setter 53, a selection margin time calculator 54, a selection information setter 55, a presentation controller 56, and a vehicle controller 57.

The controller 50 can be configured by, for example, a microcontroller which is an integrated circuit including a central processing unit (CPU), a memory, an input-output interface, and the like. In this case, the multiple information processors (51 to 57) configuring the controller 50 are implemented by the CPU executing a computer program installed in advance in the microcontroller. Parts configuring the controller 50 may be configured by an integral piece of hardware or separate pieces of hardware. The microcontroller may be served also as, for example, an electronic control unit (ECU) used for other control associated with the vehicle such as autonomous driving control.

The travel condition detector 51 detects the travel condition of the autonomous vehicle C, based on the values detected by the vehicle sensor group 11. The travel condition includes the travel position, speed, and the like of the autonomous vehicle C. The travel condition detector 51 detects the travel position of the autonomous vehicle C in the map information stored in the map information storage 30, based on the current position and movement amount of the autonomous vehicle C which are detected by the vehicle sensor group 11. The travel condition detector 51 further calculates the position of the autonomous vehicle C relative to the features recorded in the map information, based on the positions of the features detected by the peripheral sensor group 12, and thereby acquires the detailed travel position of the autonomous vehicle C in the map information.

The peripheral condition detector 52 detects the condition around the autonomous vehicle C, based on objects around the autonomous vehicle C which are detected by the peripheral sensor group 12. The objects around the autonomous vehicle C include traffic participants such as other vehicles and pedestrians and various features including lane boarder lines, traffic signals, road signs, and the like. The peripheral condition detector 52 can detect the state of a signal light of the traffic signal by performing image processing. Moreover, the peripheral condition detector 52 detects the number, positions, and speeds of other vehicles which are detected by at least one of the peripheral sensor group 12 and the communication unit 20.

The action candidate setter 53 sets an action candidate for the autonomous vehicle C to take which is a candidate for an action executable by the autonomous vehicle C in an area to which the autonomous vehicle C travels. The action candidate set by the action candidate setter 53 is related to at least one of actions including, for example, turning, lane change, cruising, branching, and merging. The action candidate setter 53 sets the action candidate executable on the road in the traveling direction by referring to an area of the map information which is in a predetermined range from the autonomous vehicle C in the traveling direction thereof.

As illustrated in FIG. 2, when the distance to an action execution point Px where the set action candidate is executed falls below a predetermined threshold, the action candidate setter 53 determines that the autonomous vehicle C approaches the action execution point Px.

When the action candidate setter 53 determines that the autonomous vehicle C approaches the action execution point Px, the selection margin time calculator 54 calculates a selection margin time Ts from the current time point to a time point where the occupant should complete the selection from the selection information, time after time. In the example illustrated in FIG. 2, description is given of the case where a travel route in which the autonomous vehicle C turns right at an intersection is set, and the occupant selects whether to turn to the right or not or selects a lane to enter the intersection for the right turn. The action execution point Px is set, for example, at the center of the intersection.

For example, as illustrated in FIGS. 2 and 3, the selection margin time calculator 54 calculates the selection margin time Ts based on the speed of the autonomous vehicle C and a forward travel distance Ls from the current position P1 of the autonomous vehicle C to the action execution point Px.

The selection margin time Ts is a guideline of time which the autonomous vehicle C takes to travel from the information presentation start position P1 where the presentation of the selection information is started to a selection completion position P2 where the selection from the selection information should be completed. The selection completion position P2 is set short of a preparation completion position P3 located away from the action execution point Px by a minimum distance required for starting the execution of the action candidate, such that there is a certain margin before the preparation completion position P3. Accordingly, as illustrated in FIG. 3, in a profile which is used for the calculation of the selection margin time Ts and which indicates the relationship between the selection margin time Ts and the forward travel distance Ls, the distance Ls to the action execution point Px has a certain margin even at the point where the selection margin time Ts is zero. Note that multiple profiles like one illustrated in FIG. 3 are set respectively for various speeds.

The selection information setter 55 sets the selection information based on the action candidate set by the action candidate setter 53, depending on the selection margin time calculated by the selection margin time calculator 54. The selection information is set by setting selection items and the maximum number of choices based on the action candidate.

Figures 5, 6:
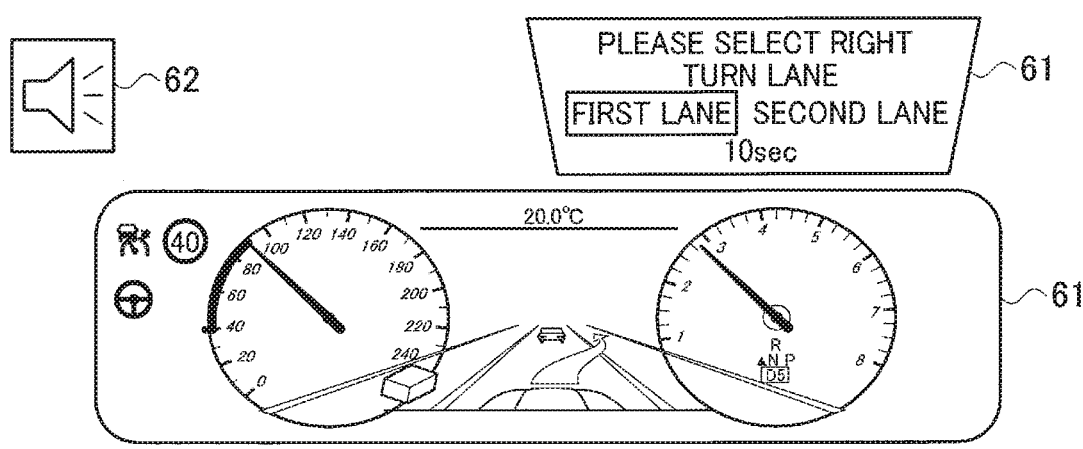
FIG. 5 is a table depicting an example of the maximum number of choices for each selection margin time in the information presenting device according to the first embodiment of the present invention.
FIG. 6 is a diagram explaining an example of a presenter in the information presenting device according to the first embodiment of the present invention.

The selection information setter 55 can set the selection items such that the shorter the selection margin time Ts is, the simpler the selection items are, and that the longer the selection margin time Ts is, the more detailed the selection items are. For example, in the example illustrated in FIG. 2, there are two right turn lanes. When the selection margin time Ts is a predetermined threshold T1 or more, as depicted in FIG. 4, whether to execute the right turn or not, lanes to travel before and after the right turn, and the like can be set as the selection items. Meanwhile, when the selection margin time Ts is less than the threshold T1, the selection item may be a simple one including only the item of whether to execute the right turn or not. Moreover, as illustrated in FIG. 5, the selection information setter 55 can set the maximum number of choices such that, the shorter the selection margin time Ts is, the smaller the maximum number of choices is, and the longer the selection margin time Ts is, the larger the maximum number of choices is.

Moreover, as the action candidates and the selection items based on the action candidate, it is possible to set the number of intersections before an intersection to make a turn (right or left turn), a position to execute a lane change for turning, a direction of a lane change, a vehicle speed in cruising, a distance between vehicles, a travel lane, a position of the vehicle in a lane in a vehicle width direction, a travel route in branching and merging, and the like. Moreover, the action candidate setter 53 may set the action candidate depending on the condition around the autonomous vehicle C. For example, when the autonomous vehicle C approaches a preceding vehicle traveling at a slower speed, the action candidate setter 53 can set an action candidate of deceleration or overtaking. For example, timing of setting the lane change as the action candidate is a moment when the distance to a preceding vehicle falls below a predetermined threshold, a moment when an obstacle is detected in front of the autonomous vehicle C, and the like.

The presentation controller 56 controls the presenter 60 such that the selection information set by the selection information setter 55 is presented to the occupant of the autonomous vehicle C.

The presenter 60 presents the selection information set by the selection information setter 55 to the occupant of the autonomous vehicle C, according to the control of the presentation controller 56. The presenter 60 presents, to the occupant, various pieces of information including the selection information from which the selection is made by the occupant. As illustrated in FIG. 6, the presenter 60 is configured by, for example, at least one of a display 61 such as a liquid crystal display or a head-up display (HUD) which displays images and characters and a speaker 62 which reproduces sounds.

In the example illustrated in FIG. 6, in addition to a message of "please select right turn lane," selection items of "first lane" and "second lane" and the selection margin time Ts of "10 sec" are displayed as the selection information on the display 61 which is a HUD configured to display a video as a virtual image by using a windshield of the autonomous vehicle C or the like. The first lane is a lane at the right end. Moreover, as illustrated in FIG. 6, the display 61 may display the travel direction of the autonomous vehicle C by an arrow together with the road, and the speaker 62 may reproduce a voice of "please select right turn lane" together with the display of the selection information.

Figure 7A:
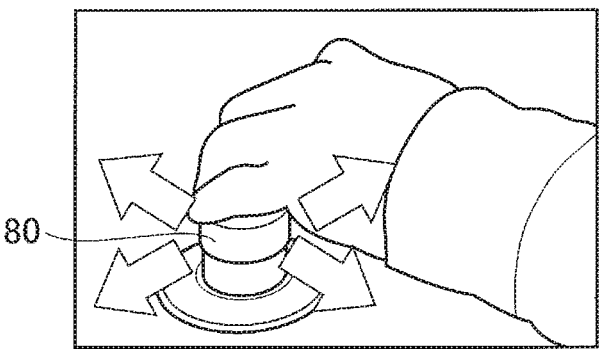
FIGS. 7A and 7B are examples illustrating an input unit in the information presenting device according to the first embodiment of the present invention.
Figure 7B:
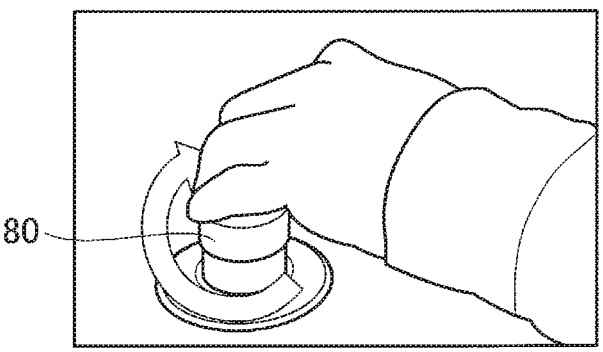
Figure 8:
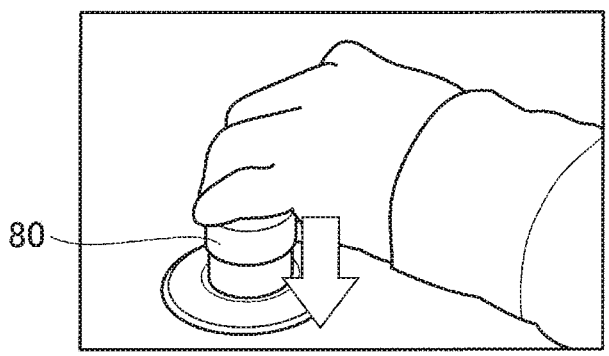
FIG. 8 is an example illustrating the input unit in the information presenting device according to the first embodiment of the present invention.

The input unit 80 is operated by the occupant of the autonomous vehicle C to receive selection from the selection information presented by the presenter 60. For example, as illustrated in FIGS. 7A and 7B, the input unit 80 is an input device operable in a horizontal direction or in a rotating direction, and can cause a cursor for specifying the selection item to move according to the operation of the occupant. In the example illustrated in FIG. 6, the selection item of "first lane" is specified. As illustrated in FIG. 8, the occupant operates the input unit 80 in a vertical direction to determine the specified item as the selection item based on the action candidate to be executed, and the selection by the occupant is completed.

The input unit 80 may be configured integrally with the display 61 as a touch panel display. Alternatively, the input unit 80 may recognize the voice of the occupant and receive it as the operation of the occupant.

Moreover, the input unit 80 may be configured such that the selection items are reselectable during the selection margin time Ts. In this case, the presenter 60 only has to keep presenting the selection information during the selection margin time Ts.

The vehicle controller 57 controls the autonomous vehicle C such that the action candidate corresponding to the selection item selected by the occupant through the input unit 80 is executed. The vehicle controller 57 controls a drive system, a steering system, and the like such that the autonomous vehicle C is autonomously driven along a set travel route, based on rules and the like set in advance, in addition to the travel condition and the peripheral condition detected respectively by the travel condition detector 51 and the peripheral condition detector 52, the map information stored in the map information storage 30, and the like.

—Information Presenting Method—

Figure 9:
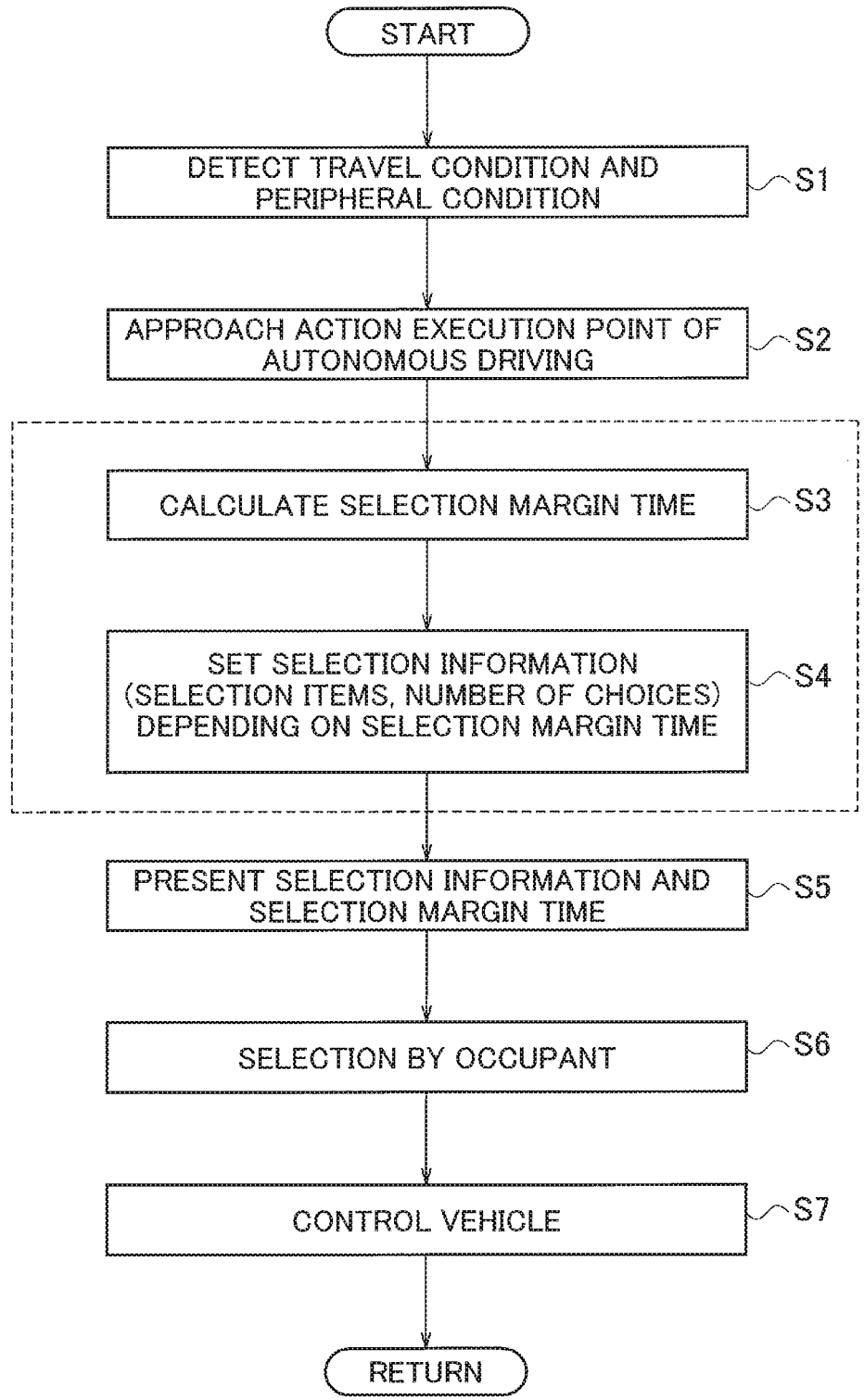
FIG. 9 is a flowchart explaining an example of an information presenting method using the information presenting device according to the first embodiment of the present invention.

An example of an information presenting method using the information presenting device according the first embodiment is described with reference to the flowchart of FIG. 9.

First, in step S1, the travel condition detector 51 and the peripheral condition detector 52 detect the travel condition and the peripheral condition of the autonomous vehicle C, based on the values detected by the vehicle sensor group 11 and the peripheral sensor group 12.

Figure 10:
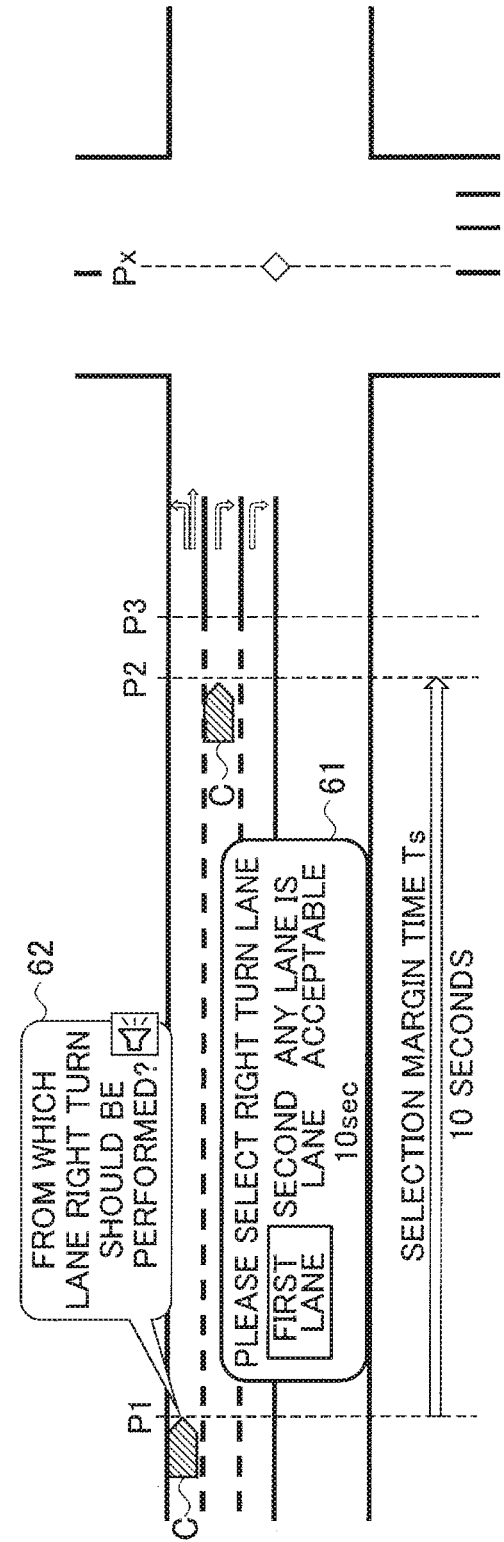
FIG. 10 is a diagram explaining an operation example of the information presenting device according to the first embodiment of the present invention.

In step S2, the action candidate setter 53 refers to the map information storage 30 and sets the action candidate executable by the autonomous vehicle C on the road in the travel direction. Moreover, when the distance to the action execution point Px where the set action candidate is executed falls below the predetermined threshold, the action candidate setter 53 determines that the autonomous vehicle C approaches the action execution point Px. For example, as illustrated in FIG. 10, the action candidate setter 53 determines that the autonomous vehicle C approaches the action execution point Px, at the position P1. The position P1 is the information presentation start position P1.

In step S3, when the action candidate setter 53 determines that the autonomous vehicle C approaches the action execution point Px, the selection margin time calculator 54 calculates the selection margin time Ts from the current time point to the time point where the occupant should complete the selection from the selection information. For example, as illustrated in FIG. 10, the selection margin time calculator 54 calculates the selection margin time Ts (10 seconds≥T1) as the time which the autonomous vehicle C takes to travel from the information presentation start position P1 to the selection completion position P2.

In step S4, the selection information setter 55 sets the selection items and the maximum number of choices based on the action candidate set in step S2, depending on the selection margin time Ts calculated in step S3. For example, as illustrated in FIG. 10, the selection information setter 55 sets "first lane," "second lane," and "any lane is acceptable" as the selection items. Note that, as illustrated in FIG. 10, regarding the messages and the like presented to the occupant, the characters displayed on the display 61 and the voice reproduced by the speaker 62 do not have to be the same and can be appropriately set such that the occupant can easily grasp the messages.

In step S5, the presentation controller 56 controls the presenter 60 such that the selection items set in step S4 are presented to the occupant of the autonomous vehicle C. As illustrated in FIG. 10, the presenter 60 presents the selection items of "first lane," "second lane," and "any lane is acceptable" to the occupant.

In step S6, the input unit 80 is operated by an occupant and receives the selection from the selection information presented by the presenter 60. For example, the input unit 80 is operated by an occupant and receives the selection of the selection item "first lane."

In step S7, the vehicle controller 57 controls the autonomous vehicle C such that the action candidate corresponding to the selection item selected by the occupant through the input unit 80 is executed. The autonomous vehicle C starts a right turn from a right-end lane, according to the selection made by the occupant through the input unit 80.

Figure 11:
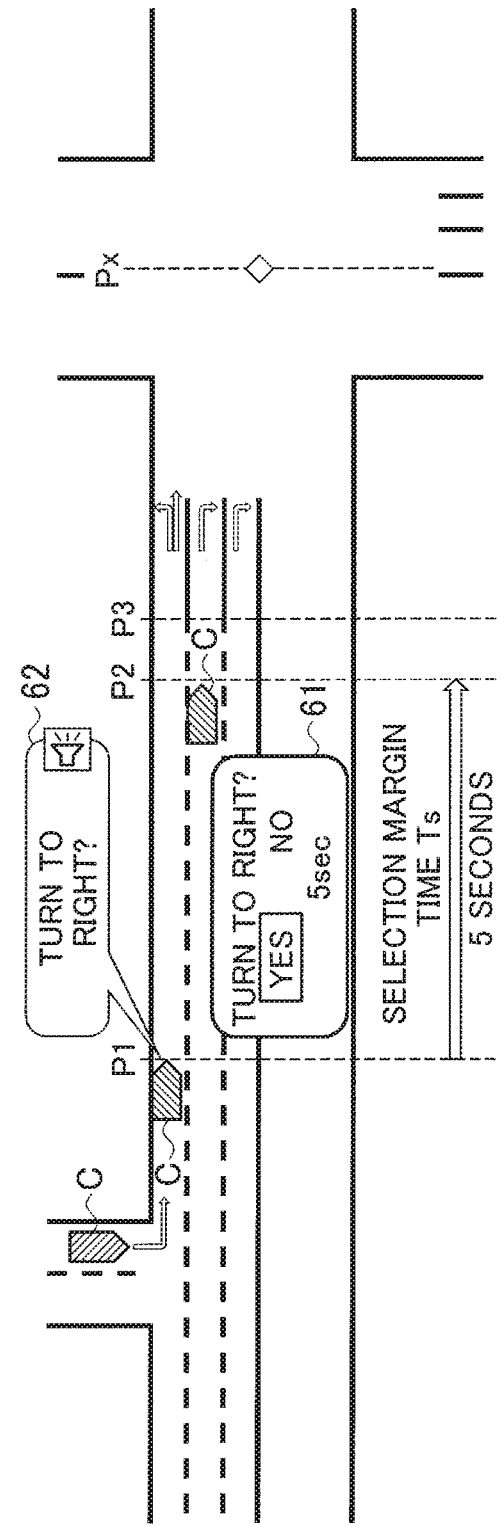
FIG. 11 is a diagram explaining an operation example of the information presenting device according to the first embodiment of the present invention in the case where the selection margin time is short.

Next, description is given of the case where the selection margin time Ts is short such as, for example, the case where the autonomous vehicle C enters a road with the action execution point Px from a side road as illustrated in FIG. 11.

After the autonomous vehicle C enters the road with the action execution point Px, the action candidate setter 53 determines that the autonomous vehicle C has already approached the action execution point Px. Accordingly, the selection margin time calculator 54 calculates a selection margin time Ts (5 seconds<T1) shorter than that in FIG. 10.

The selection information setter 55 sets, for example, a message of "turn to right?" together with selection items of "yes" and "no" as selection items simpler than those in FIG. 10, depending on the selection margin time Ts. Accordingly, when the selection margin time Ts is short, it is possible for occupant to facilitate the grasping of the selection information and reduce the time to the completion of the selection.

As described above, the information presenting device according to the first embodiment sets the selection information to be presented to the occupant depending on the selection margin time Ts, and can thereby present, to the occupant, appropriate selection information suiting the condition of the vehicle while considering the time necessary for the selection of information.

Moreover, the information presenting device according to the first embodiment sets the selection items to be presented to the occupant and the maximum number of choices depending on the selection margin time Ts, and can thereby present, to the occupant, appropriate selection information suiting the condition of the vehicle while considering the time necessary for grasping and selecting the information.

Furthermore, in the information presenting device according to the first embodiment, the shorter the selection margin time Ts is, the simpler the selection items are or the smaller the maximum number of choices is. This can reduce the time necessary for grasping and selecting the information and present, to the occupant, appropriate selection information suiting the condition of the vehicle.

Moreover, the information presenting device according to the first embodiment sets the selection information based on the action candidate relating to at least one of turning, lane change, cruising, branching, and merging, and can thereby present, to the occupant, appropriate selection information suiting the various conditions of the vehicle while considering the time necessary for the selection of information.

Furthermore, the information presenting device according to the first embodiment presents the selection margin time Ts to the occupant simultaneously with the selection information. The occupant can thereby easily grasp the time limit to complete the selection and the sureness in the selection of the selection information can be improved.

Moreover, the information presenting device according to the first embodiment calculates the selection margin time Ts based on the distance from the current position of the autonomous vehicle C to the action execution point Px, and can thereby improve accuracy of the selection margin time Ts which is the travel time to the point where the selection should be completed.

Furthermore, the information presenting device according to the first embodiment allows reselection from the selection information during the selection margin time Ts. Due to this, when the occupant selects a wrong selection item, the occupant can reselect a desired selection item.

Second Embodiment

An information presenting device according to a second embodiment of the present invention is different from that in the first embodiment in points that the selection margin time calculator 54 calculates the selection margin time Ts depending on other vehicles around the autonomous vehicle C. The configurations, operations, and effects not described in the second embodiment are substantially the same as those in the first embodiment and overlapping description is omitted.

Figure 12:
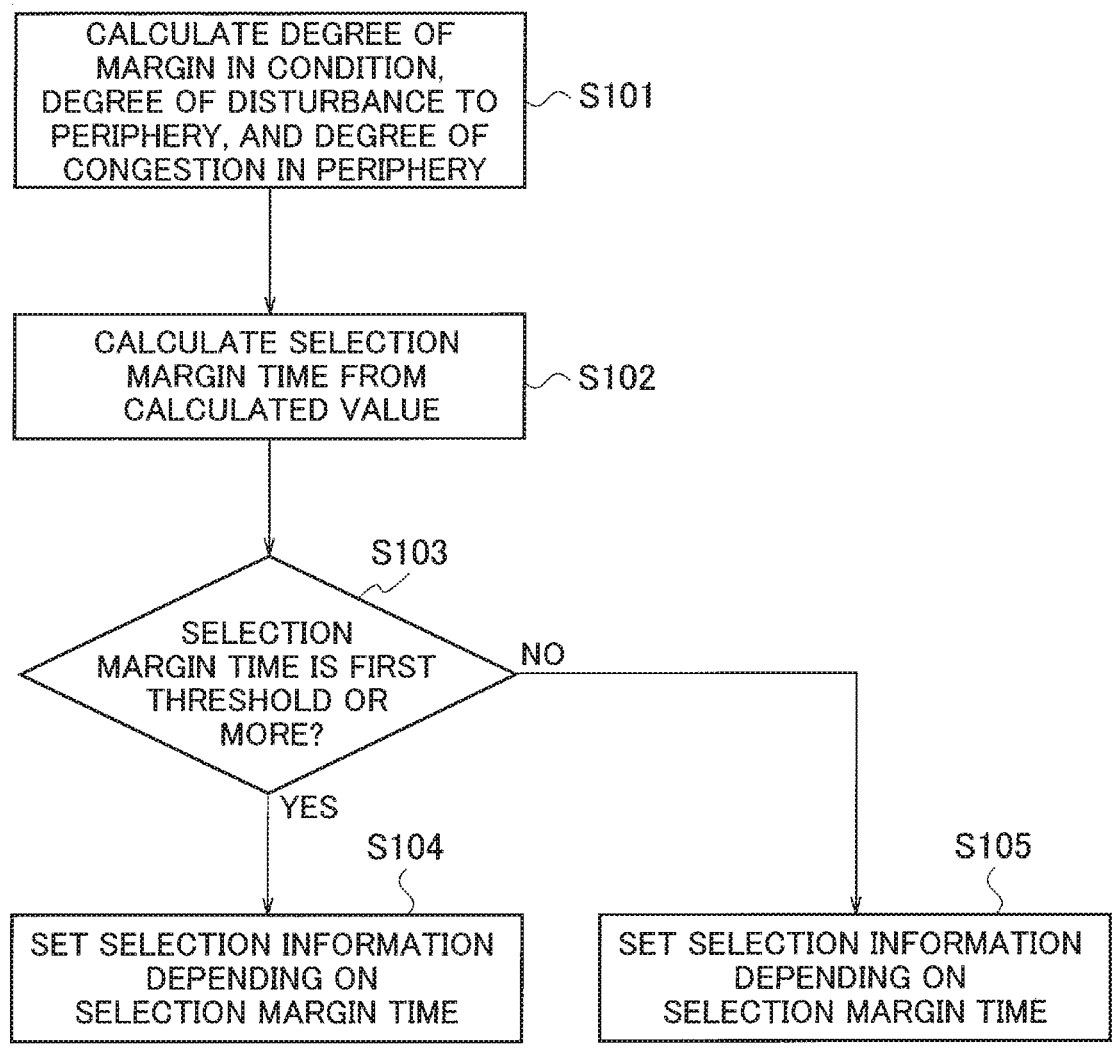
FIG. 12 is a flowchart explaining an example of an information presenting method using an information presenting device according to a second embodiment of the present invention.

An example of an information presenting method using the information presenting device according to the second embodiment is described with reference to the flowchart of FIG. 12. Since a series of processes depicted in the flowchart of FIG. 12 corresponds to steps S3 and S4 depicted in the flowchart of FIG. 9, description of the other steps is omitted.

In step S101, when the autonomous vehicle C approaches the action execution point Px, the selection margin time calculator 54 calculates and determines at least one of a degree of margin in condition, a degree of disturbance to the periphery, and a degree of congestion in the periphery.

Figure 13:
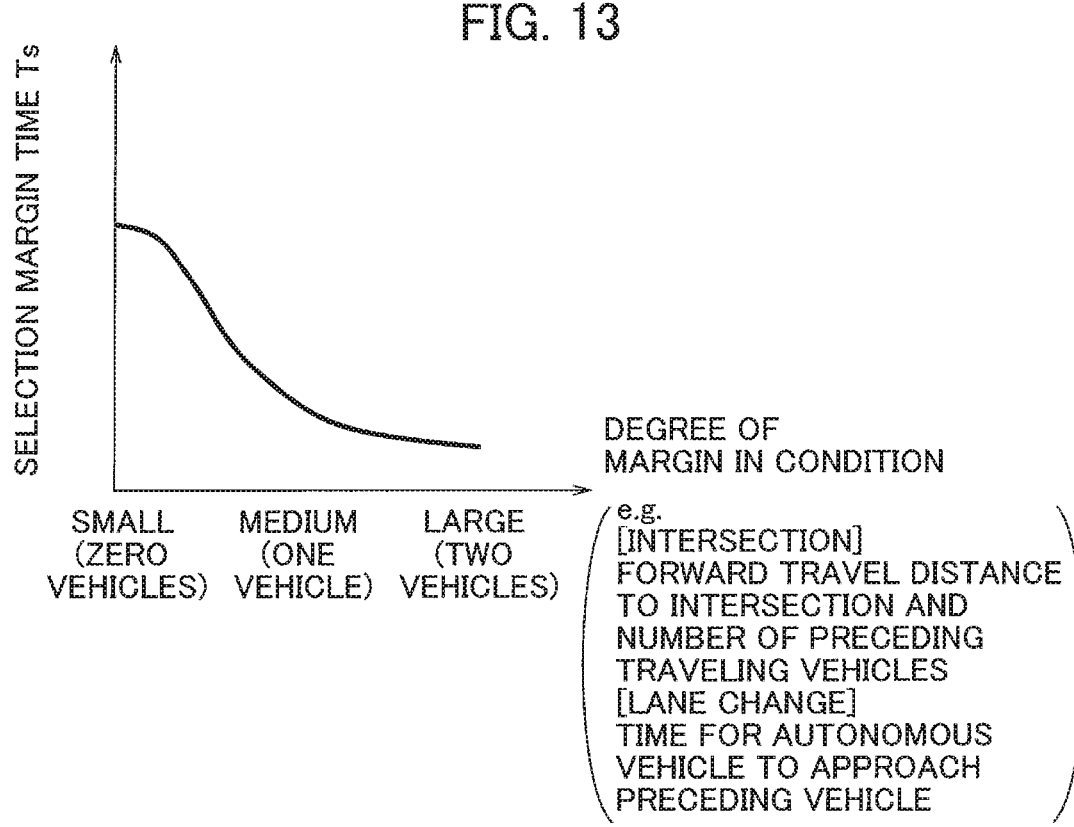
FIG. 13 is a diagram explaining a method of calculating the selection margin time based on a degree of margin in condition in the information presenting device according to the second embodiment of the present invention.

For example, as illustrated in FIG. 13, when the action candidate is a turn at an intersection, the number of other vehicles in front of the autonomous vehicle C and before the intersection and the distance from the current position to the intersection can be employed for the determination of the degree of margin in condition. Moreover, when the action candidate is lane change, the time which the autonomous vehicle C takes to approach the other vehicle in front of the autonomous vehicle C to a predetermined distance can be employed.

Figure 14:
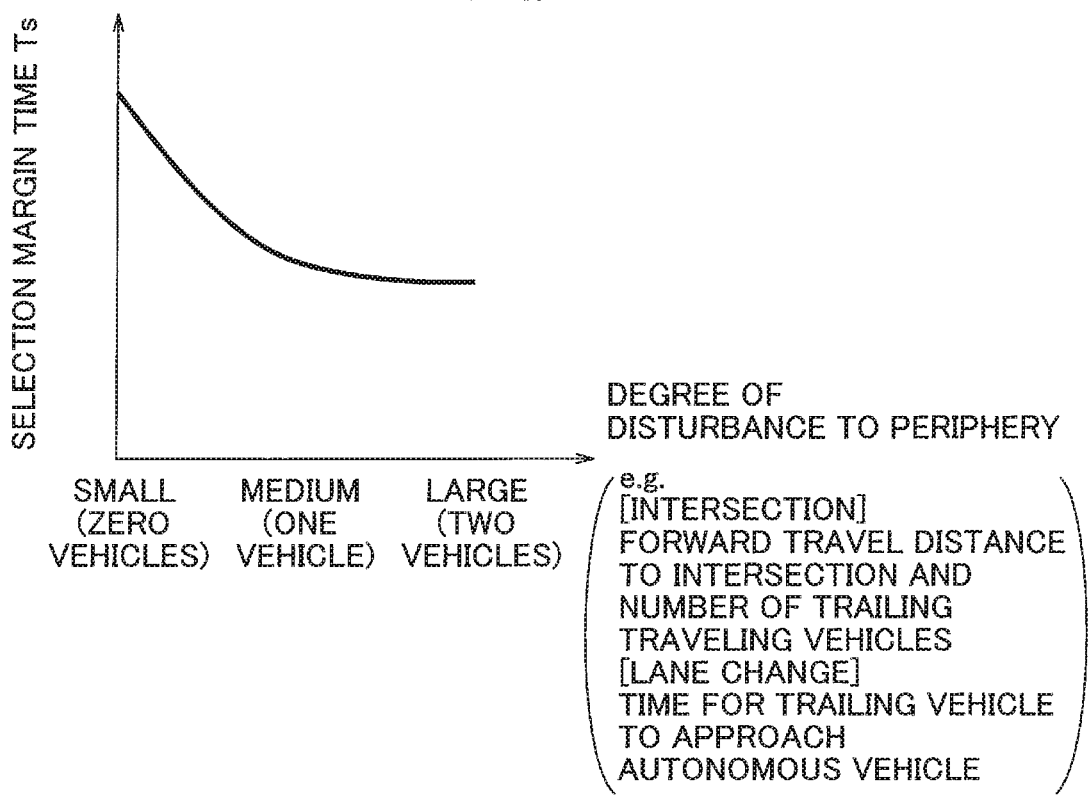
FIG. 14 is a diagram explaining a method of calculating the selection margin time based on a degree of disturbance to a periphery in the information presenting device according to the second embodiment of the present invention.

For example, as illustrated in FIG. 14, when the action candidate is a turn at an intersection, the number of other vehicles behind the autonomous vehicle C and the distance from the current position to the intersection can be employed for the determination of the degree of disturbance to the periphery. Moreover, when the action candidate is lane change, the time the other vehicle behind the autonomous vehicle C takes to approach the autonomous vehicle C to a predetermined distance can be employed.

Figure 15:
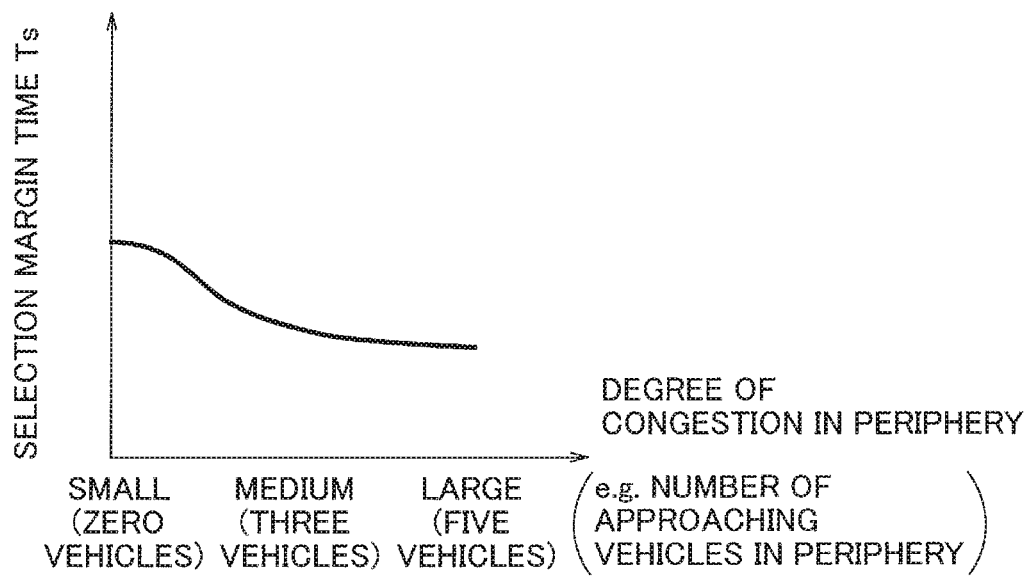
FIG. 15 is a diagram explaining a method of calculating the selection margin time based on a degree of congestion in the periphery in the information presenting device according to the second embodiment of the present invention.

For example, as illustrated in FIG. 15, the number of other vehicles in a predetermined range from the autonomous vehicle C can be employed for the determination of the degree of congestion in the periphery.

In step S102, the selection margin time calculator 54 calculates the selection margin time Ts based on at least one of the degree of margin in condition, the degree of disturbance to the periphery, and the degree of congestion in the periphery determined in step S101.

As illustrated in FIG. 13, when the selection margin time calculator 54 calculates the selection margin time Ts based on the degree of margin in condition, the larger the number of other vehicles in front of the autonomous vehicle C is, the shorter the selection margin time Ts is. Multiple profiles indicating the relationship between the degree of margin in condition and the selection margin time Ts like one illustrated in FIG. 13 are set respectively for various distances to the intersection, and the longer the distance to the intersection is, the longer the selection margin time Ts is.

As illustrated in FIG. 14, when the selection margin time calculator 54 calculates the selection margin time Ts based on the degree of disturbance to the periphery, the larger the number of other vehicles behind the autonomous vehicle C is, the shorter the selection margin time Ts is. Multiple profiles indicating the relationship between the degree of disturbance to the periphery and the selection margin time Ts like one illustrated in FIG. 14 are set respectively for various distances to the intersection, and the longer the distance to the intersection is, the longer the selection margin time Ts is.

As illustrated in FIG. 15, when the selection margin time calculator 54 calculates the selection margin time Ts based on the degree of congestion in the periphery, the larger the number of vehicle in the periphery is, the shorter the selection margin time Ts is. Note that the selection margin time calculator 54 can arbitrarily employ at least one of the degree of margin in condition, the degree of disturbance to the periphery, and the degree of congestion in the periphery, and the weighting of each degree in the calculation of the selection margin time Ts can be arbitrarily set.

Figure 16:
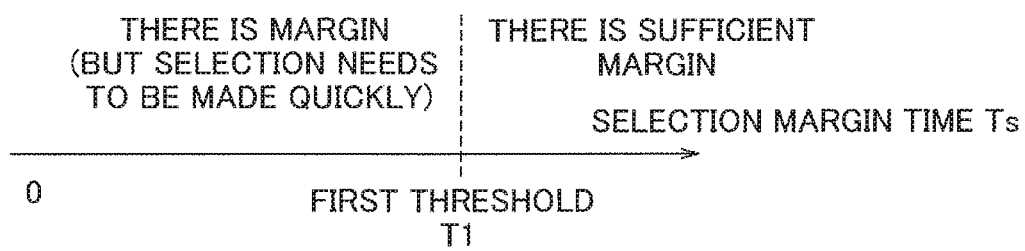
FIG. 16 is a diagram explaining a first threshold set for the selection margin time in the information presenting device according to the second embodiment of the present invention.

In step S103, as illustrated in FIG. 16, the selection information setter 55 determines whether or not the selection margin time Ts calculated in step S102 is a first threshold T1 or more. The selection information setter 55 causes the processing to proceeds to step S104 when the selection margin time Ts is the first threshold T1 or more and causes the processing to proceed to step S105 when the selection margin time Ts is less than the first threshold T1.

In step S104, the selection information setter 55 sets the selection items and the maximum number of choices based on the action candidate depending on the selection margin time Ts calculated in step S102, and thereby sets the selection information to be presented to the occupant.

In step S105, the selection information setter 55 sets the selection items simpler than the selection items in step S104 and the maximum number of choices smaller than the maximum number of choices in step S104 depending on the selection margin time Ts calculated in step S102, and can thereby set the selection information to be presented to the occupant.

Figure 17:
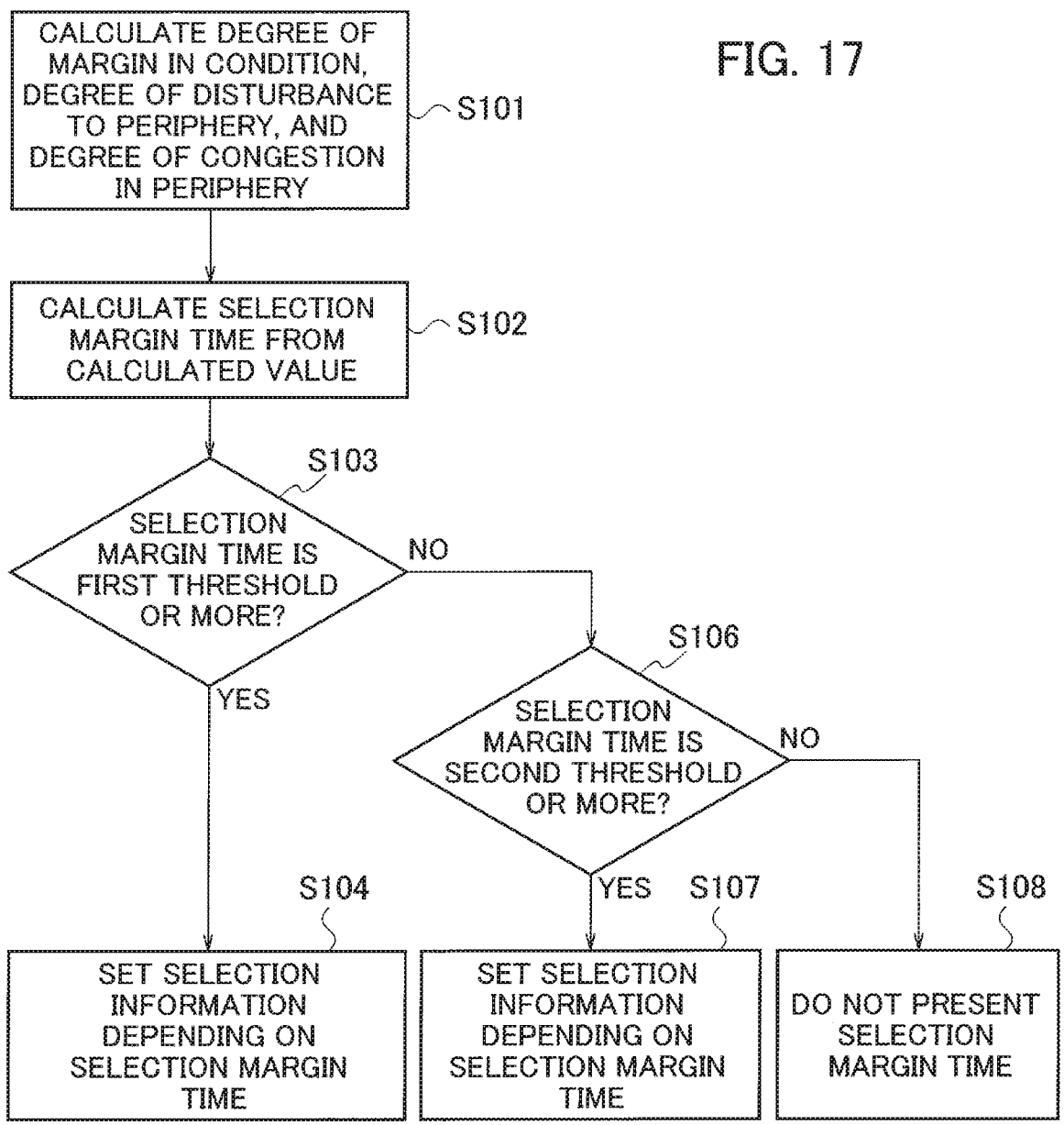
FIG. 17 is a flowchart explaining an example of an information presenting method using the information presenting device according to the second embodiment of the present invention.

Two or more thresholds may be set for the selection margin time Ts. For example, FIG. 17 depicts a flowchart in the case where the first threshold T1 and a second threshold T2 smaller than the first threshold T1 are set for the selection margin time Ts. Processes in steps S101, S102, and S104 in the flowchart of FIG. 17 are the same as those in the flowchart of FIG. 16.

Figure 18:
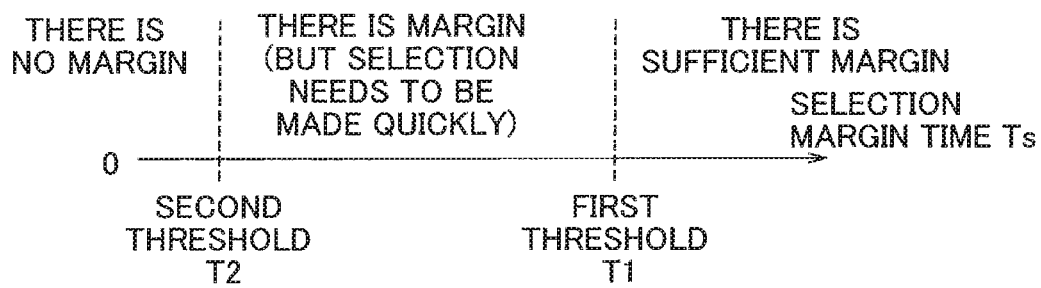
FIG. 18 is a diagram explaining a first threshold and a second threshold set for the selection margin time in the information presenting device according to the second embodiment of the present invention.

In step S103, as illustrated in FIG. 18, the selection information setter 55 determines whether or not the selection margin time Ts calculated in step S102 is the first threshold T1 or more. The selection information setter 55 causes the processing to proceed to step S104 when the selection margin time Ts is the first threshold T1 or more and causes the processing to proceed to step S106 when the selection margin time Ts is less than the first threshold T1.

In step S106, the selection information setter 55 determines whether or not the selection margin time Ts calculated in step S102 is the second threshold T2 or more. The selection information setter 55 causes the processing to proceed to step S107 when the selection margin time Ts is the second threshold T2 or more and causes the processing to proceed to step S108 when the selection margin time Ts is less than the second threshold T2.

In step S107, the selection information setter 55 sets the selection items simpler than the selection items in step S104 and the maximum number of choices smaller than the maximum number of choices in step S104 depending on the selection margin time Ts calculated in step S102, and can thereby set the selection information to be presented to the occupant.

In step S108, the selection information setter 55 does not set the selection information so as not to present the selection margin time and the selection information and cancels the set action candidate. Alternatively, the selection information setter 55 may set the selection items simpler than the selection items in steps S104 and S107 and the maximum number of choices smaller than the maximum numbers of choices in steps S104 and S107.

Description is given of the case where the selection margin time calculator 54 calculates the selection margin time Ts based on the degree of margin in condition with reference to FIGS. 19A and 19B. As illustrated in FIG. 19A, the action candidate setter 53 determines at the position P1 that the autonomous vehicle C approaches an intersection which is the action execution point for performing a left turn with no other vehicle being in front of the autonomous vehicle C. In this case, the selection margin time calculator 54 calculates that the selection margin time Ts is, for example, 10 seconds, based on the degree of margin in condition, and the presenter 60 presents the selection information suiting the selection margin time Ts to the occupant by using the display 61 and the speaker 62. When the autonomous vehicle C reaches the preparation completion position P3, the presenter 60 presents execution of the left turn to the occupant and the autonomous vehicle C executes the left turn.

Meanwhile, as illustrated in FIG. 19B, when another vehicle D is in front of the autonomous vehicle C, the selection margin time calculator 54 calculates a selection margin time Ts (for example, 7 seconds) shorter than that in the case where no other vehicle is in front of the autonomous vehicle C, based on the degree of margin in condition. The selection margin time calculator 54 can thereby improve the accuracy of the selection margin time Ts which is the travel time to the point where the selection should be completed, while considering the other vehicle D in front of the autonomous vehicle C.

Description is given of the case where the selection margin time calculator 54 calculates the selection margin time Ts based on the degree of disturbance to the periphery with reference to FIGS. 20A and 20B. As illustrated in FIG. 20A, in a state where no other vehicle is behind the autonomous vehicle C, the selection margin time calculator 54 calculates that the selection margin time Ts is, for example, 10 seconds, based on the degree of disturbance to the periphery, and the presenter 60 presents the selection information suiting the selection margin time Ts to the occupant by using the display 61 and the speaker 62.

Meanwhile, as illustrated in FIG. 20B, when the other vehicle D is behind the autonomous vehicle C, the selection margin time calculator 54 calculates a selection margin time Ts (for example, 7 seconds) shorter than that in the case where no other vehicle is behind the autonomous vehicle C, based on the degree of disturbance to the periphery. The selection margin time calculator 54 can thereby improve the accuracy of the selection margin time Ts which is the travel time to the point where the selection should be completed, while considering the degree of disturbance to the periphery.

Description is given of the case where the selection margin time calculator 54 calculates the selection margin time Ts based on the degree of congestion in the periphery with reference to FIGS. 21A and 21B. As illustrated in FIG. 21A, in a state where no other vehicle is around the autonomous vehicle C, the selection margin time calculator 54 calculates that the selection margin time Ts is, for example, 10 seconds, based on the degree of congestion in the periphery, and the presenter 60 presents the selection information suiting the selection margin time Ts to the occupant by using the display 61 and the speaker 62.

Meanwhile, as illustrated in FIG. 21B, when the other vehicle D is around the autonomous vehicle C, the selection margin time calculator 54 calculates a selection margin time Ts (for example, 7 seconds) shorter than that in the case where no other vehicle is behind the autonomous vehicle C, based on the degree of congestion in the periphery. The selection margin time calculator 54 can thereby improve the accuracy of the selection margin time Ts which is the travel time to the point where the selection should be completed, while considering the degree of congestion in the periphery.

Description is given of the case where the selection margin time calculator 54 calculates the selection margin time Ts based on the degree of margin in condition, the degree of disturbance to the periphery, and the degree of congestion in the periphery with reference to FIGS. 22A and 22B. As illustrated in FIG. 22A, the action candidate setter 53 determines at the position P1 that the autonomous vehicle C approaches an intersection which is the action execution point for performing a left turn with no other vehicle being in front of the autonomous vehicle C. In this case, the selection margin time calculator 54 calculates that the selection margin time Ts is, for example, 10 seconds, based on the degree of margin in condition, and the presenter 60 presents the selection information suiting the selection margin time Ts to the occupant by using the display 61 and the speaker 62. When the autonomous vehicle C reaches the preparation completion position P3, the presenter 60 presents execution of the left turn to the occupant and the autonomous vehicle C executes the left turn.

Meanwhile, as illustrated in FIG. 22B, when the other vehicles D are in front of and behind the autonomous vehicle C, the selection margin time calculator 54 calculates a selection margin time Ts (for example, 5 seconds) shorter than that in the case where one of the degree of margin in condition, the degree of disturbance to the periphery, and the degree of congestion in the periphery is used, based on the degree of margin in condition, the degree of disturbance to the periphery, and the degree of congestion in the periphery. The selection margin time calculator 54 can thereby improve the accuracy of the selection margin time Ts which is the travel time to the point where the selection should be completed, by calculating the selection margin time Ts by using the degree of margin in condition, the degree of disturbance to the periphery, and the degree of congestion in the periphery.

Figure 23A:
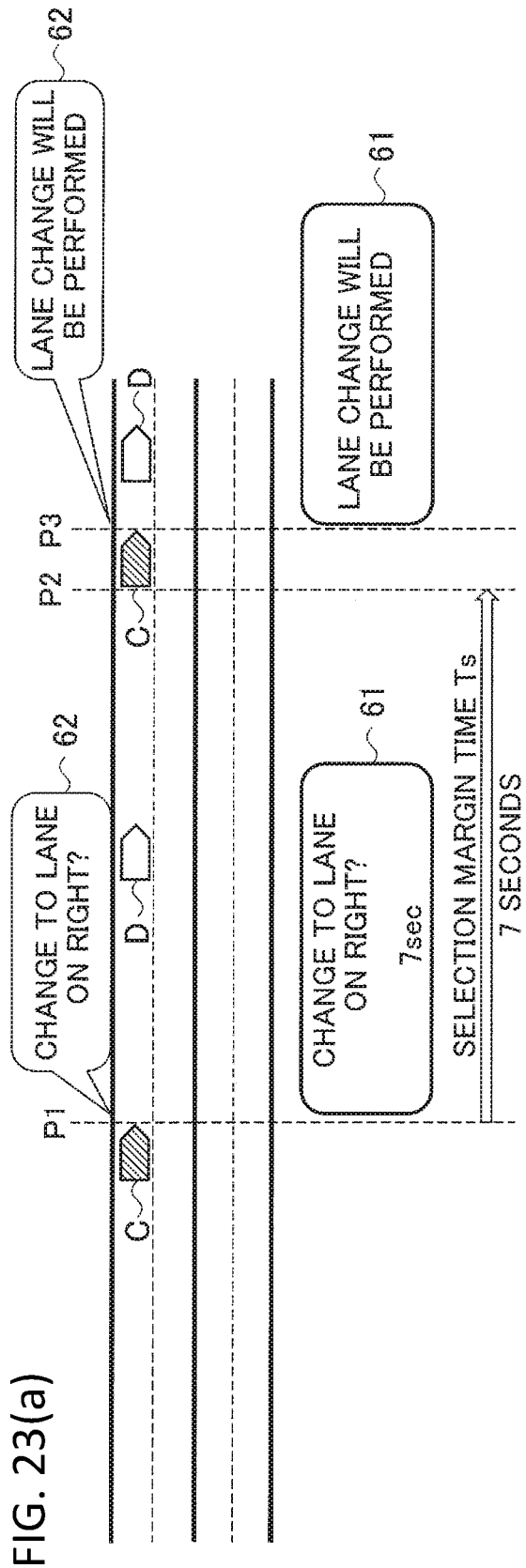
FIGS. 23A and 23B are diagrams explaining an operation example of the information presenting device according to the second embodiment of the present invention.
Figure 23B:
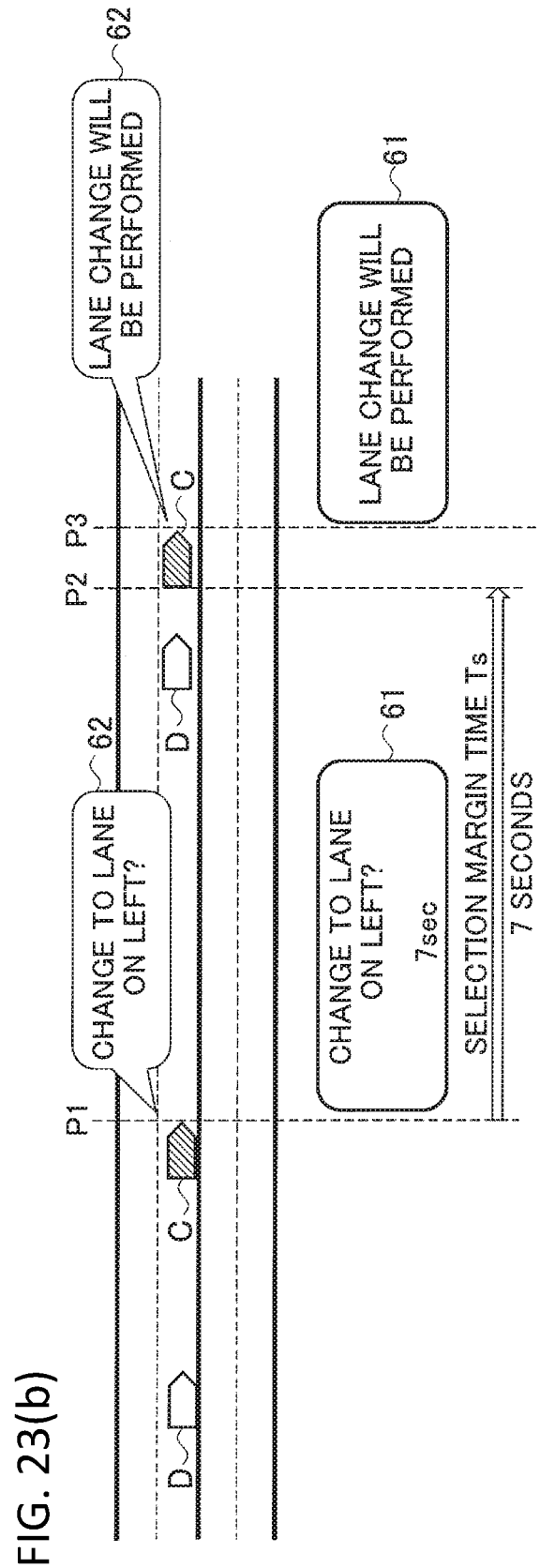

Description is given of the case where the action candidate is the lane change and the selection margin time calculator 54 calculates the selection margin time Ts based on the degree of margin in condition, the degree of disturbance to the periphery, and the degree of congestion in the periphery with reference to FIGS. 23A and 23B. As illustrated in FIG. 23A, in a state where the other vehicle D is present only in front of the autonomous vehicle C, the selection margin time calculator 54 calculates that the selection margin time Ts is, for example, 7 seconds, based on the degree of margin in condition, the degree of disturbance to the periphery, and the degree of congestion in the periphery. When reaching the preparation completion position P3, the autonomous vehicle C turns on turn signals and starts the lane change.

Meanwhile, as illustrated in FIG. 23B, when the other vehicle D is behind the autonomous vehicle C, the selection margin time calculator 54 calculates that the selection margin time Ts is, for example, 7 seconds, based on the degree of margin in condition, the degree of disturbance to the periphery, and the degree of congestion in the periphery. In other words, the travel time to the point where the selection should be completed is the same in the examples illustrated in FIGS. 23A and 23B.

Figure 24A:
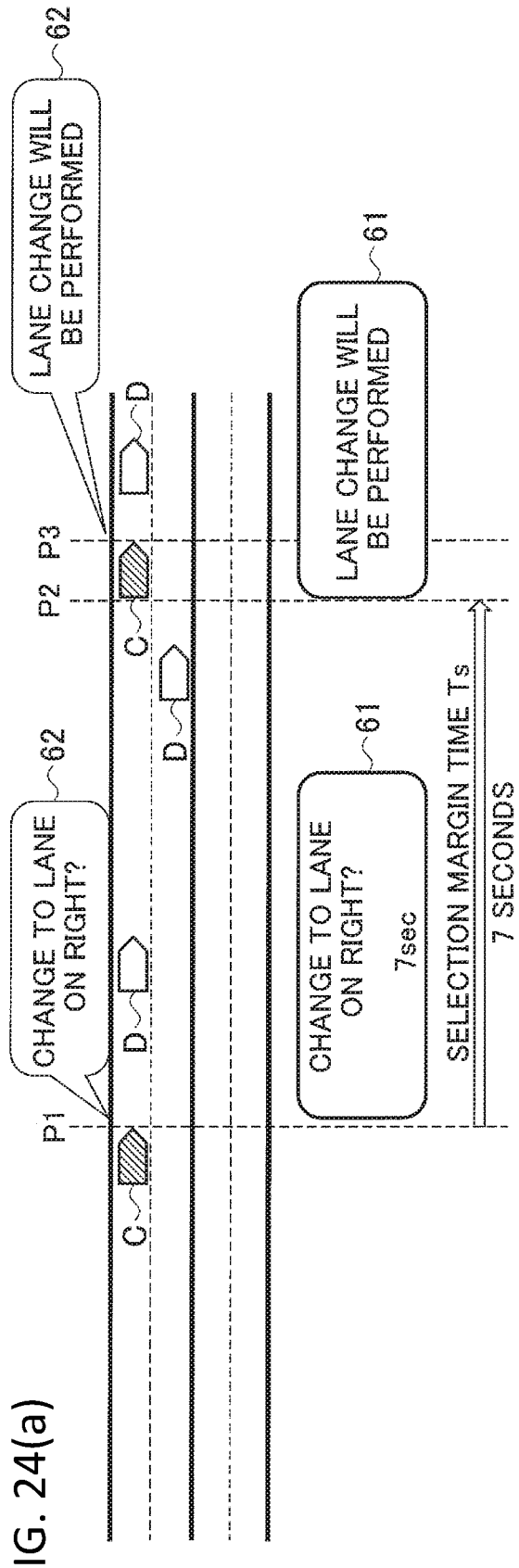
FIGS. 24A and 24B are diagrams explaining an operation example of the information presenting device according to the second embodiment of the present invention.
Figure 24B:
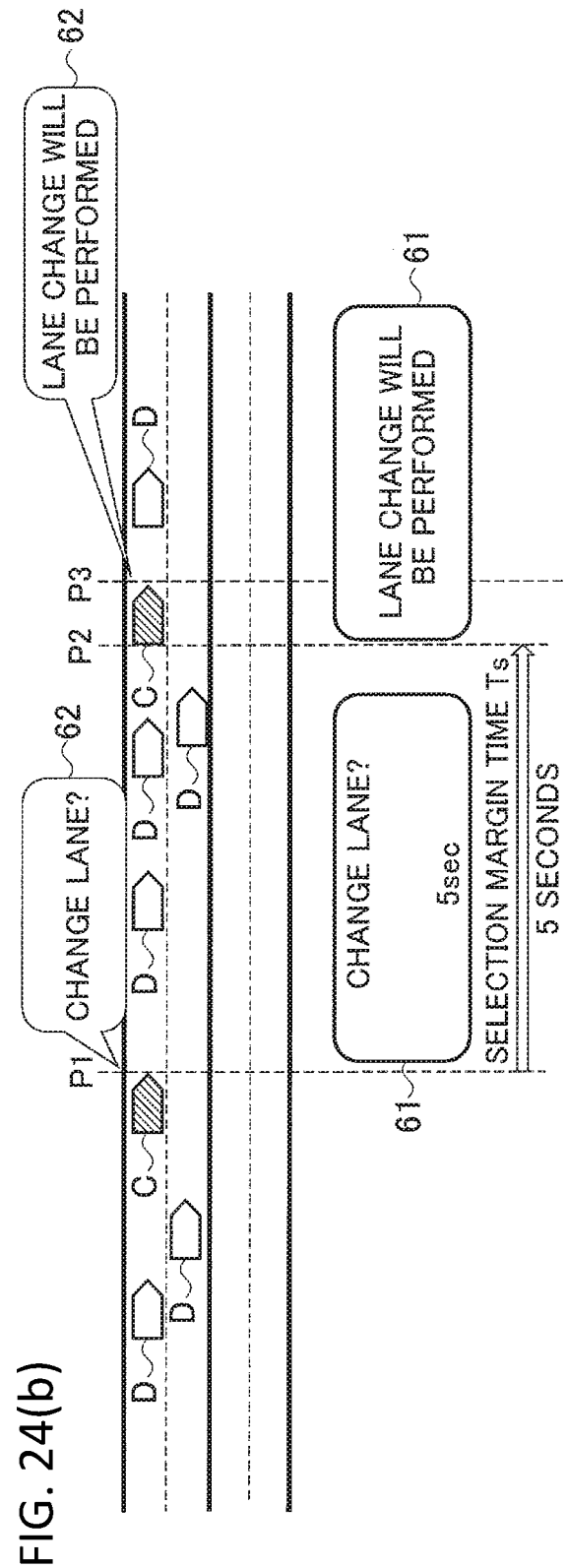

Description is given of the case where the action candidate is the lane change and the selection margin time calculator 54 calculates the selection margin time Ts based on the degree of margin in condition, the degree of disturbance to the periphery, and the degree of congestion in the periphery with reference to FIGS. 24A and 24B. As illustrated in FIG. 24A, in a state where two other vehicles D are in front of the autonomous vehicle C, the selection margin time calculator 54 calculates that the selection margin time Ts is, for example, 7 seconds, based on the degree of margin in condition, the degree of disturbance to the periphery, and the degree of congestion in the periphery.

Meanwhile, as illustrated in FIG. 24B, when many other vehicles D are around the autonomous vehicle C, the selection margin time calculator 54 calculates that the selection margin time Ts is, for example, 5 seconds, based on the degree of margin in condition, the degree of disturbance to the periphery, and the degree of congestion in the periphery. As described above, the selection margin time calculator 54 calculates the selection margin time Ts such that the more the number of other vehicles D in the periphery is, the shorter the selection margin time Ts is.

A method of calculating the selection margin time Ts based on the degree of margin in condition, the degree of disturbance to the periphery, and the degree of congestion in the periphery when the autonomous vehicle C is stationary or is traveling at a speed less than a predetermined speed (for example, 10 km/h) is different from that in normal travel (for example, 10 km/h or more).

Figure 25:
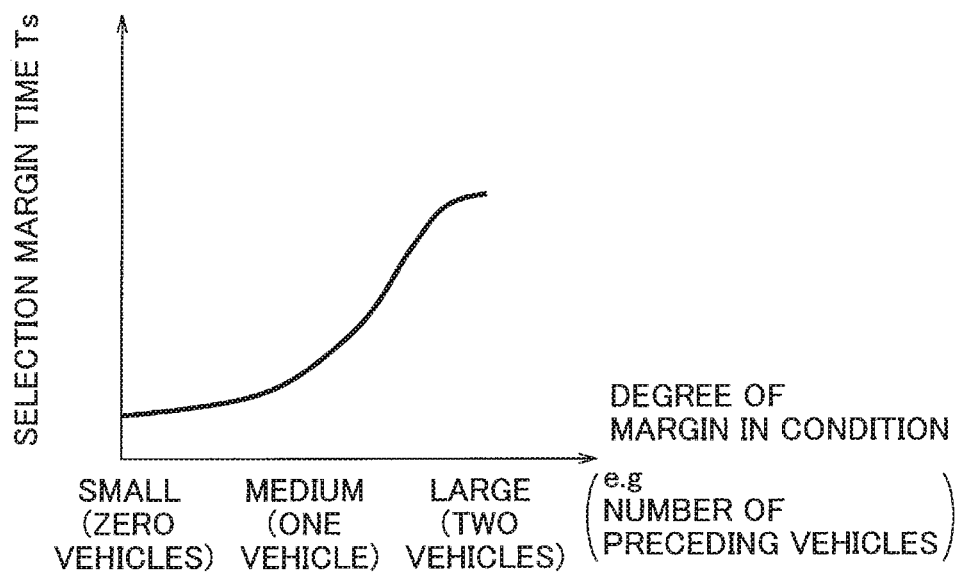
FIG. 25 is a diagram explaining a method of calculating the selection margin time based on the degree of congestion in the periphery when the vehicle is stopped in the information presenting device according to the second embodiment of the present invention.

For example, as illustrated in FIG. 25, the number of other vehicles in front of the autonomous vehicle C can be employed for the determination of the degree of margin in condition. When the selection margin time calculator 54 calculates the selection margin time Ts based on the degree of margin in condition, the larger the number of other vehicles in front of the autonomous vehicle C is, the longer the selection margin time Ts is.

Figure 26:
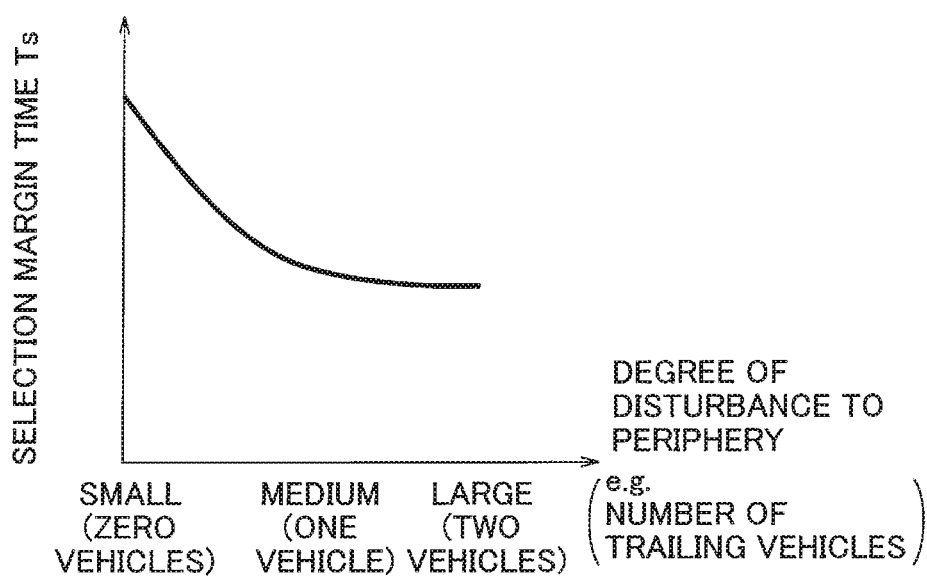
FIG. 26 is a diagram explaining a method of calculating the selection margin time based on the degree of disturbance to the periphery when the vehicle is stopped in the information presenting device according to the second embodiment of the present invention.

For example, as illustrated in FIG. 26, the number of other vehicles behind the autonomous vehicle C can be employed for the determination of the degree of disturbance to the periphery. When the selection margin time calculator 54 calculates the selection margin time Ts based on the degree of disturbance to the periphery, the larger the number of other vehicles behind the autonomous vehicle C is, the shorter the selection margin time Ts is.

Figure 27:
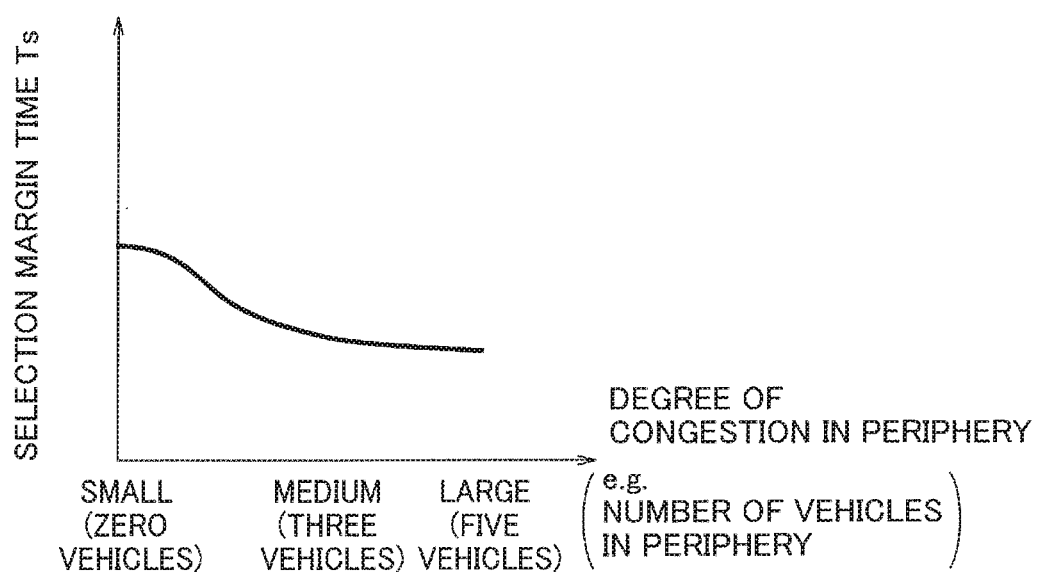
FIG. 27 is a diagram explaining a method of calculating the selection margin time based on the degree of congestion in the periphery when the vehicle is stopped in the information presenting device according to the second embodiment of the present invention.

For example, as illustrated in FIG. 27, the number of other vehicles around the autonomous vehicle C which are within a predetermined range from the autonomous vehicle C can be employed for the determination of the degree of congestion in the periphery. When the selection margin time calculator 54 calculates the selection margin time Ts based on the degree of congestion in the periphery, the larger the number of other vehicles around the autonomous vehicle C is, the shorter the selection margin time Ts is.

Figure 28:
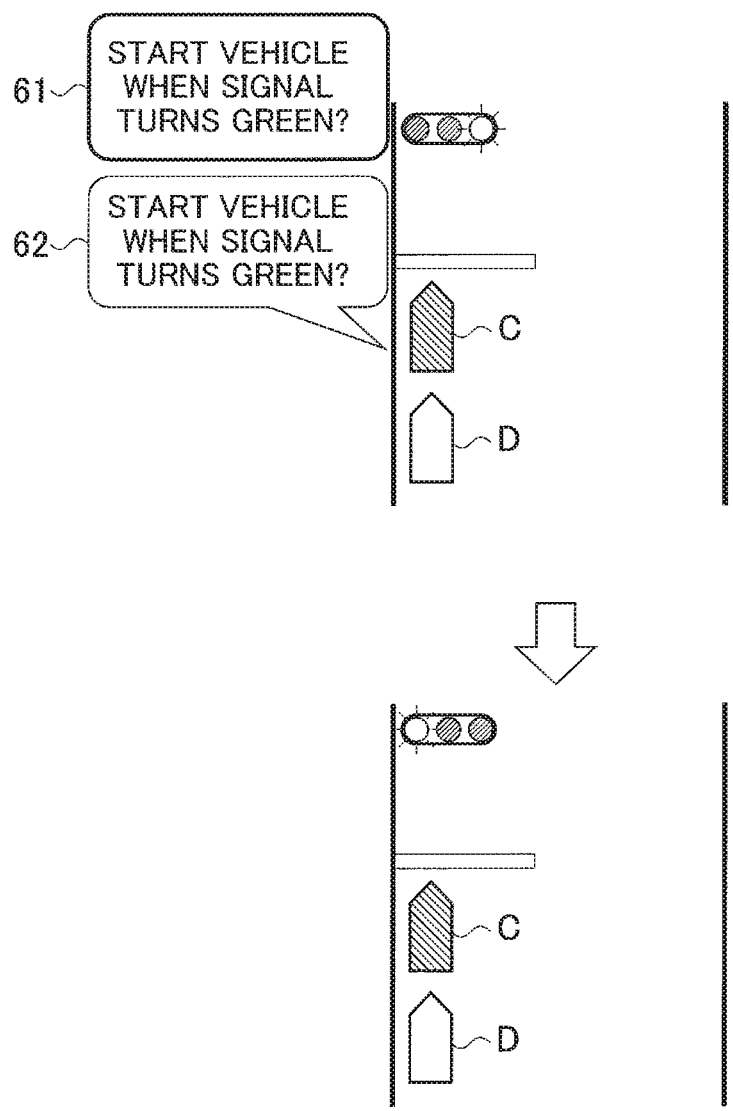
FIG. 28 is a diagram explaining an operation example of the information presenting device according to the second embodiment of the present invention.

FIG. 28 is a diagram the case where start or non-start is set as the action candidate and the selection margin time Ts is substantially 0 (equal to or less than the second threshold). The autonomous vehicle C is stopped at a stop position first in line due to a red signal. Since the selection margin time Ts is substantially 0, the presenter 60 presents, to the occupant, a message such as, for example, "start vehicle when signal turns green?" and selection items indicating yes and no for this message while the signal is red. The occupant can thereby select whether to start the autonomous vehicle C or not before the signal turns green.

Figure 29:
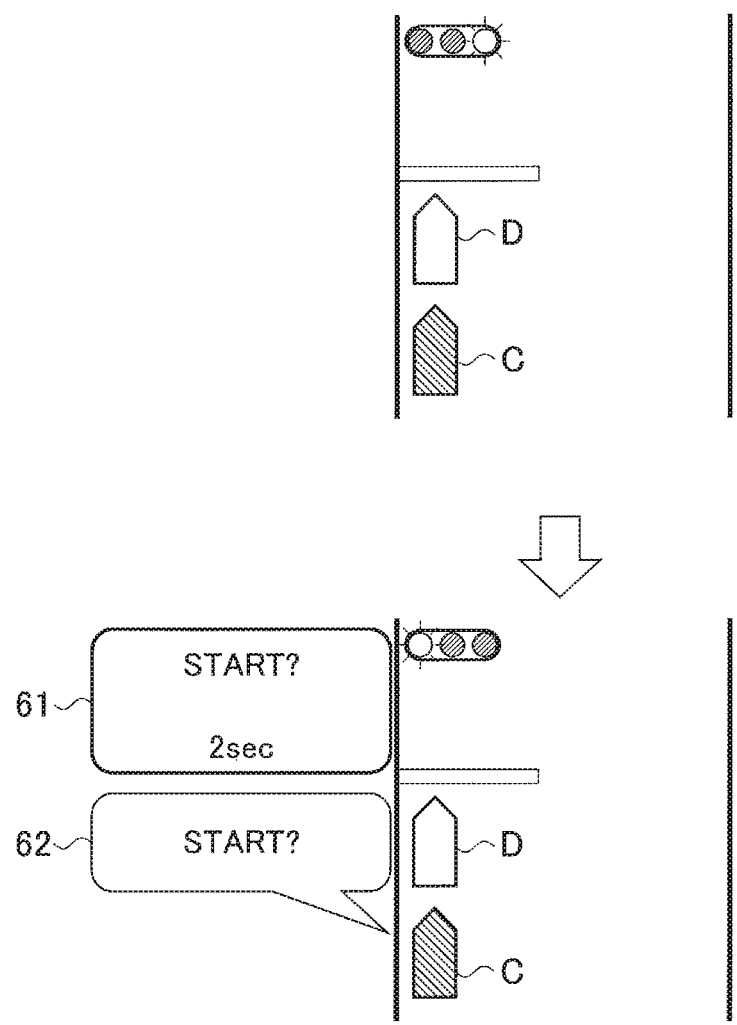
FIG. 29 is a diagram explaining an operation example of the information presenting device according to the second embodiment of the present invention.

FIG. 29 is a diagram explaining the case where the selection margin time Ts is less than the first threshold and is the second threshold or more. The autonomous vehicle C is behind one other vehicle D. In this case, the presenter 60 presents, to the occupant, the selection margin time Ts, a simple message such as "start vehicle?," and selection items indicating yes and no for this message, in response to changing of the signal to green.

Figure 30:
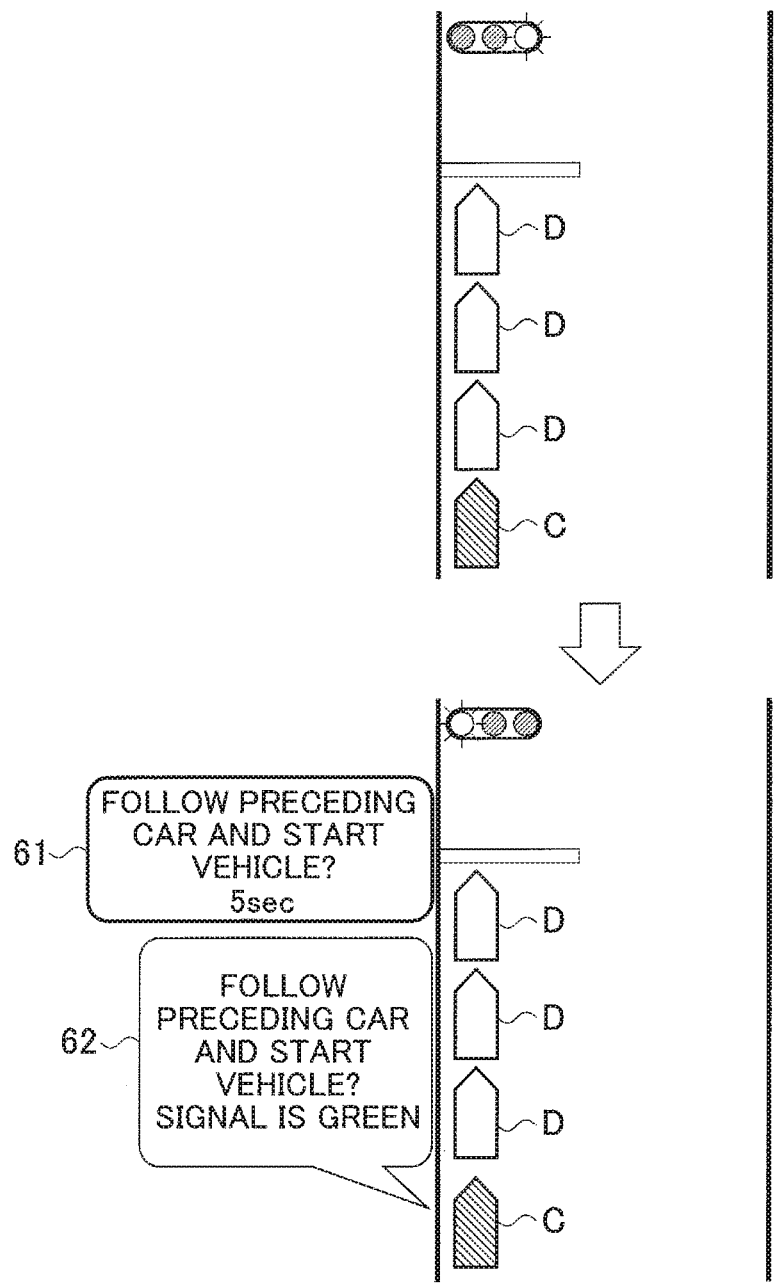
FIG. 30 is a diagram explaining an operation example of the information presenting device according to the second embodiment of the present invention.

FIG. 30 is a diagram explaining the case where the selection margin time Ts is the first threshold or more. The autonomous vehicle C is behind multiple other vehicles D. In this case, the presenter 60 presents, to the occupant, the selection margin time Ts, a relatively-detailed message such as "follow preceding car and start vehicle?," and selection items indicating yes and no for this message, in response to changing of the signal to green.

In the examples illustrated in FIGS. 28 to 30, the timing of presenting the selection information is not limited to the timing of the signal and may be, for example, the timing at which a traffic participant such as a pedestrian blocking the autonomous vehicle C in the traveling direction is gone.

As described above, the information presenting device according to the second embodiment sets the selection information to be presented to the occupant depending on the selection margin time Ts and can thereby present, to the occupant, appropriate selection information suiting the condition of the vehicle while considering the time necessary for the selection of information.

Moreover, the information presenting device according to the second embodiment calculates the selection margin time Ts based on at least one of the degree of margin in condition, the degree of disturbance to the periphery, and the degree of congestion in the periphery which are determined depending on the condition around the autonomous vehicle C, and can thereby highly-accurately calculate the selection margin time Ts which is the travel time to the point where the selection should be completed, while considering the condition around the autonomous vehicle C.

Other Embodiments

Although the present invention has been described above by using the aforementioned first and second embodiments, it should not be understood that the description and drawings forming part of this disclosure limit the present invention. From this disclosure, various alternative embodiments, examples, and operations techniques will be found by those skilled in the art.

Figure 31:
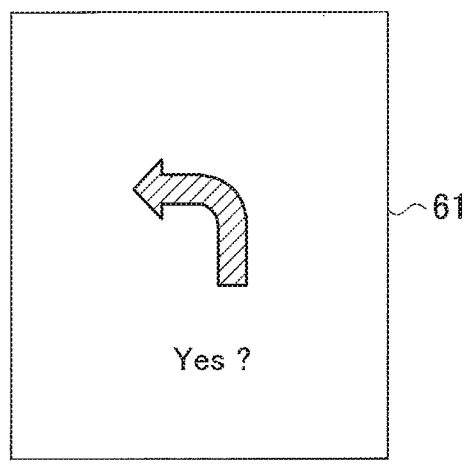
FIG. 31 is a diagram explaining an example of a display screen in an information presenting device according to another embodiment of the present invention.
Figure 32:
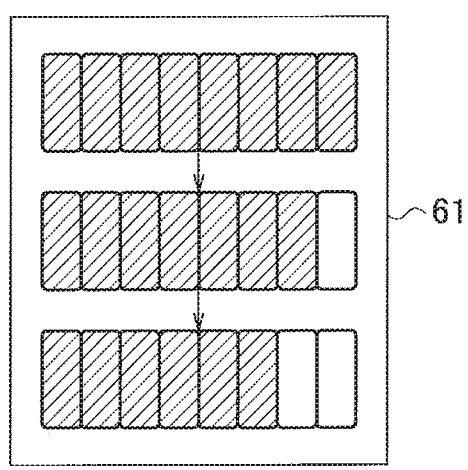
FIG. 32 is a diagram explaining an example of a display screen in an information presenting device according to another embodiment of the present invention.

For example, in the first and second embodiments, as illustrated in FIG. 31, the presenter 60 may display, for example, an icon of an arrow extending in a travel direction on the display 61 as the selection item indicating execution or non-execution of a left turn. This can further reduce the time necessary for the occupant to grasp the selection information. Moreover, as illustrated in FIG. 32, the display 61 may present the selection margin time Ts by using, instead of a countdown using Arabic numerals, a gauge-like display whose lighted region decreases. Furthermore, the presenter 60 may change a presentation state of the selection margin time Ts by adjusting the length, interval, frequency, and the like of the sound reproduced by the speaker 62, or by reading out the selection margin time Ts. The occupant can thereby intuitionally grasp the selection margin time Ts.

Moreover, the first and second embodiments may be configured such that the selection information setter 55 determines the most-recommended selection item out of the selection items and, when the occupant selects a selection item other than the most-recommended selection item, the presenter 60 confirms the selection content with the occupant. The intention of the occupant can be thereby confirmed and it is possible to reduce the case where the autonomous vehicle C takes an action which is not intended by the occupant.

Furthermore, the functions described in the first and second embodiments can be executed by one or multiple processing circuits. The processing circuit includes a programed processing device such as a processing device including an electric circuit. The processing circuit may include devices such as circuit components and an application specific integrated circuit (ASIC) designed to execute the described functions.

The present invention includes various embodiments and the like which are not described herein such as configurations mutually adopting the aforementioned configurations, as a matter of course. Accordingly, the technical scope of the present invention should be determined only by the matters specifying the invention in the scope of claims regarded as appropriate based on the aforementioned description.

REFERENCE SIGNS LIST 51 travel condition detector
52 peripheral condition detector
53 action candidate setter
54 selection margin time calculator
55 selection information setter
56 presentation controller
60 presenter
80 input unit
C autonomous vehicle
D other vehicle

The invention claimed is:

1. An information presenting device in an autonomous vehicle, the information presenting device configured to present selection information from which a selection is made by the occupant, the selection being related to an action candidate, the action candidate being a candidate for an action executable by the autonomous vehicle, the information presenting device comprising:
an action candidate setter configured to set the action candidate for the autonomous vehicle;
a controller configured to:
calculate a selection margin time based on a position where an execution of the action begins; and
sets the selection information by setting selection items and a maximum number of choices based on the action candidate, depending on the selection margin time; and
a display configured to present the selection information changed by the controller to the occupant, the controller further configured to:
receive the selection from the selection information presented by the display, where the selection is made by an operation of the occupant.

2. The information presenting device according to claim 1, wherein the controller sets the selection items such that the shorter the selection margin time is, the simpler the selection items are.

3. The information presenting device according to claim 1, wherein the controller sets the maximum number of choices such that the shorter the selection margin time is, the smaller the maximum number of choices is.

4. The information presenting device according to claim 1, wherein the controller sets the selection information based on the action candidate, the action candidate related to at least one of turning, lane change, cruising, branching, and merging.

5. The information presenting device according to claim 1, wherein the controller determines a most-recommended selection item out of the selection items, and when the occupant selects a selection item other than the most-recommended selection item, the display confirms a selection content with the occupant.

6. The information presenting device according to claim 1, wherein the display presents the selection margin time and the selection information to the occupant.

7. The information presenting device according to claim 6, wherein the display changes a presentation state of the selection margin time depending on the selection margin time.

8. The information presenting device according to claim 1, wherein the controller calculates the selection margin time based on a distance from a current position of the autonomous vehicle to an action execution point where the action is executed.

9. The information presenting device according to claim 1, wherein the controller calculates the selection margin time based on a degree of margin in condition determined from the number of other vehicles in front of the autonomous vehicle and from a distance from a current position of the autonomous vehicle to an action execution point where the action is executed.

10. The information presenting device according to claim 1, wherein the controller calculates the selection margin time based on a degree of disturbance to a periphery determined from the number of other vehicles behind the autonomous vehicle.

11. The information presenting device according to claim 1, wherein the controller calculates the selection margin time based on a degree of congestion in a periphery determined from the number of other vehicles around the autonomous vehicle.

12. The information presenting device according to claim 1, wherein the controller sets the selection information depending on vehicles around the autonomous vehicle.

13. The information presenting device according to claim 1, wherein the display keeps presenting the selection information during the selection margin time, and the input unit allows reselection from the selection information during the selection margin time.

14. The information presenting device according to claim 1, wherein the display presents the selection information to the occupant by using at least one of an image and a sound.

15. An information presenting method of an information presenting device in an autonomous vehicle, the information presenting device configured to present selection information from which a selection is made by the occupant, the selection being related to an action candidate that is a candidate for an action executable by the autonomous vehicle, the information presenting method comprising:

calculating a selection margin time based on a position where an execution of the action begins;

setting the selection information by setting selection items and a maximum number of choices based on the action candidate for the autonomous vehicle, depending on the selection margin time;

presenting the changed selection information to the occupant; and receiving the selection from the presented selection information, the selection being made by an operation of the occupant.

16. An information presenting device in an autonomous vehicle, the information presenting device configured to present selection information from which a selection is made by the occupant, the selection being related to an action candidate, the action candidate being a candidate for an action executable by the autonomous vehicle, the information presenting device comprising:

a controller configured to:

calculate a selection margin time based on a position where an execution of the action begins; and change the selection information depending on the selection margin time; and a display configured to present the selection information changed by the controller to the occupant, the controller further configured to:

receive the selection from the selection information presented by the display, where the selection is made by an operation of the occupant, wherein the display keeps presenting the selection information during the selection margin time, and the input unit allows reselection from the selection information during the selection margin time.

* * * * *